US006764640B1

United States Patent
Talkington et al.

(10) Patent No.: US 6,764,640 B1
(45) Date of Patent: Jul. 20, 2004

(54) TORCH-BASED CUTTING TOOL

(75) Inventors: John Talkington, Spring, TX (US); Andy Joseph, Pickerington, OH (US); Dennis Duane Harwig, Powell, OH (US)

(73) Assignee: Edison Welding Institute, Columbus, OH (US)

( * ) Notice: Subject to any disclaimer, the term of this patent is extended or adjusted under 35 U.S.C. 154(b) by 106 days.

(21) Appl. No.: 10/285,945

(22) Filed: Oct. 31, 2002

Related U.S. Application Data

(60) Provisional application No. 60/415,312, filed on Sep. 30, 2002, and provisional application No. 60/335,666, filed on Oct. 31, 2001.

(51) Int. Cl.[7] ............................................. B23K 37/02
(52) U.S. Cl. ......................................... 266/77; 266/48
(58) Field of Search .............................. 266/48, 65, 69, 266/77

(56) References Cited

U.S. PATENT DOCUMENTS

| | | | | |
|---|---|---|---|---|
| 2,356,811 A | * | 8/1944 | Bellrose | 266/77 |
| 3,785,631 A | * | 1/1974 | Prye | 266/77 |
| 4,256,288 A | * | 3/1981 | Rojas | 266/77 |
| 5,256,212 A | * | 10/1993 | Magnuson | 266/77 |
| 6,696,012 B1 | * | 2/2004 | Theriot | 266/48 |

* cited by examiner

Primary Examiner—Scott Kastler
(74) Attorney, Agent, or Firm—Michael J. Gallagher; David J. Dawsey; Gallagher & Dawsey Co., LPA

(57) ABSTRACT

A torch cutting tool has a clamp that is attached to a workpiece with the clamp having a rotating platform with an attached first latch member. A second latch member is attached to a track with a moveable carriage on which is mounted a positioning arm with a torch holder. After the clamp is attached to the workpiece, the second latch member is quickly latched to the first latch member to effect quick and simple setup. A cam follower, a second rotating platform, a second positioning arm, a covered track, a rotating base plate and metered fuel and oxygen supplies make the tool simple and easy to use.

41 Claims, 11 Drawing Sheets

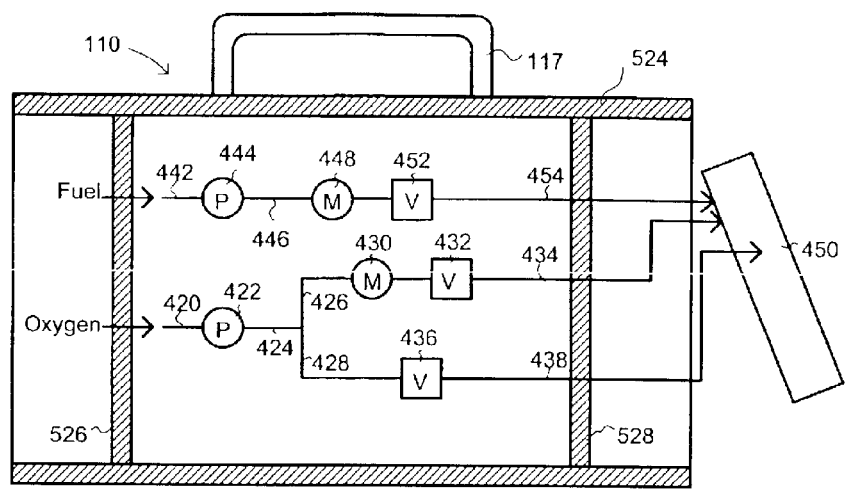
Fig. 8
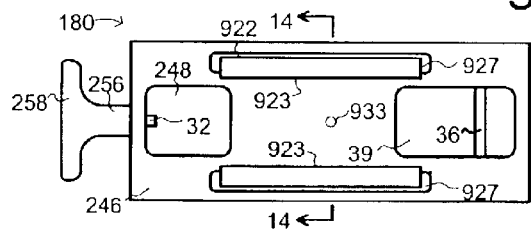
Fig. 9
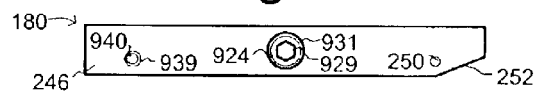
Fig. 10
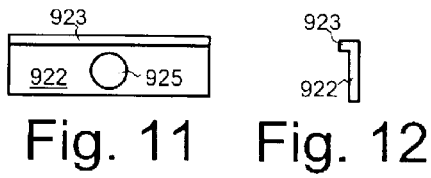
Fig. 11  Fig. 12
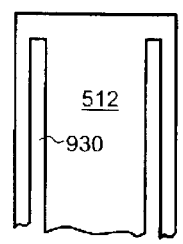
Fig. 13
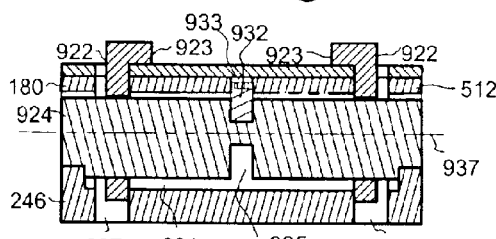
Fig. 14
Fig. 15

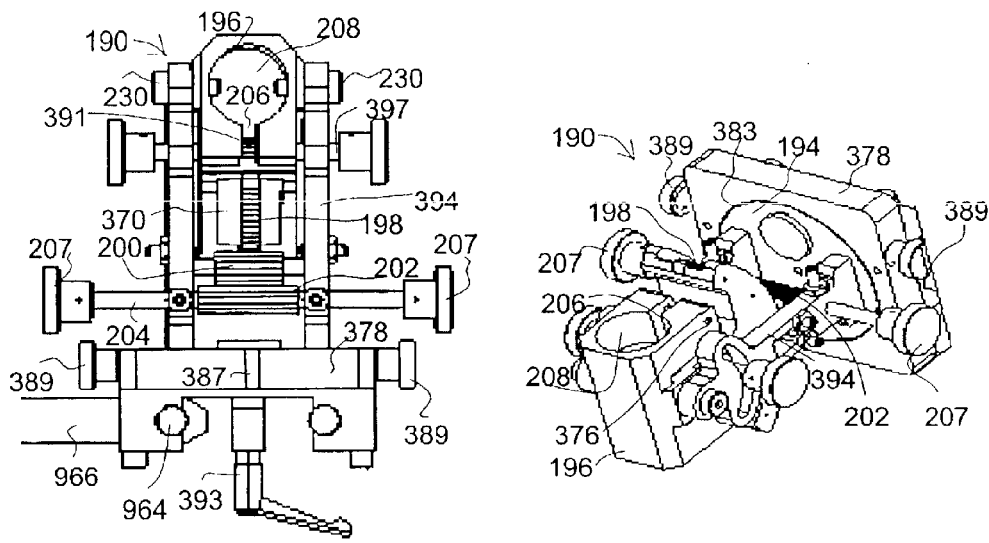
Fig. 26
Fig. 23
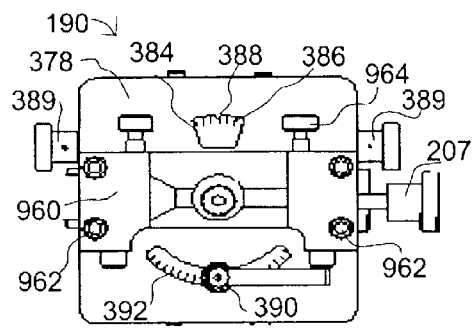
Fig. 24
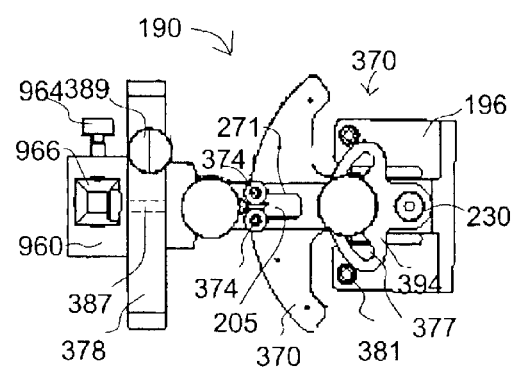
Fig. 25

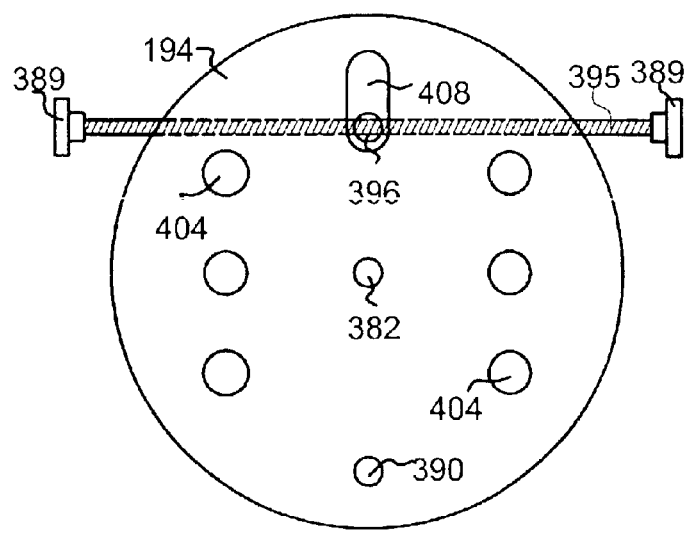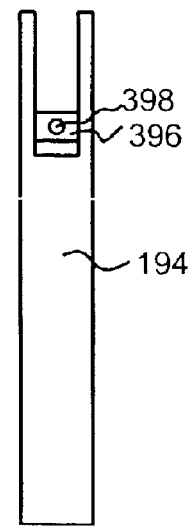
Fig. 27   Fig. 28
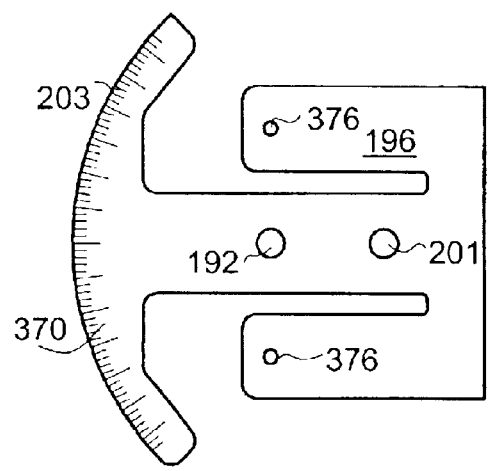
Fig. 29

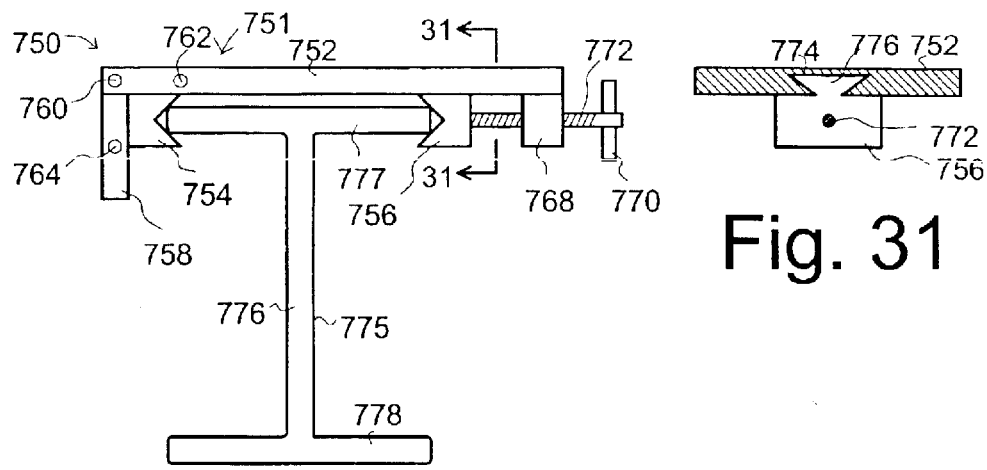
Fig. 30
Fig. 31
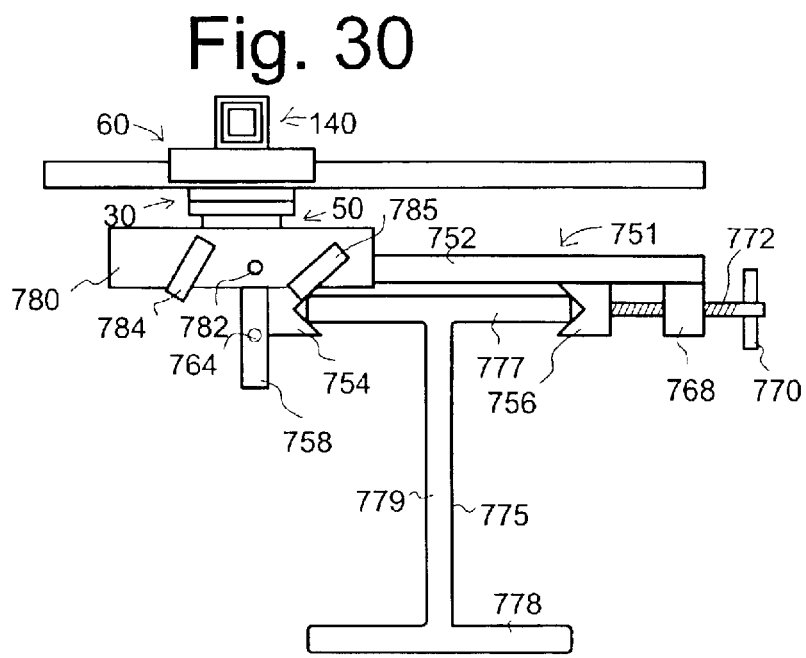
Fig. 32

TORCH-BASED CUTTING TOOL

CROSS REFERENCE TO RELATED APPLICATIONS

This application claims the benefit of U.S. Provisional Applications No. 60/335,666 filed on Oct. 31, 2001 and 60/415,312 filed on Sep. 30, 2002, both of which are incorporated here by reference as if completely written herein.

STATEMENT REGARDING FEDERALLY SPONSORED RESEARCH

The U.S. Government has a paid-up license in this invention and the right in limited circumstances to require the patent owner to license others on reasonable terms as provided for the terms of contract No. N00014-98-2-0010, subcontract No. 105 awarded by the United States Office of Naval Research.

BACKGROUND

As background, ships are typically made in transverse sections that are joined together in dry dock. These sections have horizontal steel ribs (stiffeners) that are attached to the walls (bulkhead) of the ship section. These stiffeners, are also known as erection beams or bulb-flat stiffeners and are used to provide support to and prevent buckling of the panels used in shipbuilding. The bulb-flat stiffeners are welded at their edge to ship sections (portions of the hull) prior to the attachment of the transverse sections to each other. They are also used with interior bulkheads (vertical walls) as well as with deck plating (flooring). For the hull and bulkheads, stiffeners are attached to the hull and bulkheads in a vertical orientation. When used with decking, they are used in a horizontal orientation. Bulb-flat stiffeners are in many respects analogous to the wall studs and floor joists typically used in home construction.

When a ship section is made, the bulb-flat stiffeners extend past the ends of the wall section and must be trimmed in the ship building process, i.e., in the assembly of the ship sections. In the ship building process, a new section is brought into place next to the end of the previously assembled sections and the amount of extending bulb-flat stiffener that needs to be trimmed off is marked for cutting. The new section is moved away from the assembled sections and a cutting torch (oxygen and gas or oxygen and acetylene) is then used to cut off the excess portion of the stiffener. After the ends of the bulb-flat stiffeners are trimmed to the appropriate length, the edge of the new section is butted against the edge of the previously assembled sections of the ship that has already been welded in place and the two abutting sections, i.e., the abutting edges (ends) of the hull and the bulb-flat stiffeners are welded together.

In present day practice, the bulb-flat stiffeners are trimmed entirely by hand, i.e., a section assembler takes a cutting torch and trims off the excess portion of stiffener by means of a free-hand, visual inspection ("eye-ball") method. Unfortunately the work place environment is typically not worker friendly in that the worker doing the bulb-flat cutting often works more than a hundred feet in the air on temporary scaffolding in a dark and dirty environment that is not at all conducive to making straight and accurate cuts. As a result, the free-hand trimming of excess bulb flat ends can result in large gaps between adjacent bulb-flat stiffener ends when the sections are brought into position for final assembly. It is not unusual for it to take an hour or longer to fill in the gaps between the ends of the bulb-flat stiffeners when the ends are welded together.

Although some efforts have been made to mechanize cutting of various members in other industries, none of those devices meet the needs of the ship building industry. For example, U.S. Pat. No. 5,160,549 (Murphy) discloses a cam follower device for cutting angled finned tubes. This device relies on completely supporting the work piece in the cutting machine. U.S. Pat. No. 3,190,628 (Litzka) describes a device for cutting center sections from I beams but, here again, the device relies on supporting and/or clamping the device and the work piece to a solid work bed. U.S. Pat. No. 4,180,248 (Benko) is directed to a sill cutting unit but here the machine is supported independently of the work piece. In all three patents, the units are very large and do not provide the portability needed for use in the ship building arts. U.S. Pat. No. 4,471,948 (Holmes) is directed to a cutting unit that is attached to the work piece but in this instance the torch travels in an arc about a pivot pin with a cam used to maintain the cutting torch at a relatively constant distance from the work piece.

None of these devices teach or suggest a portable unit for making straight line bevel cuts with provisions for cutting a large bulb member at one edge of the work piece that must be fashioned into a scoop to allow for high-quality and high-strength welds required in the ship building arts. Further none of these references teach how such a device might be adapted for the varying cutting angles required in joining the angled sections of a ship or aligning the torch for cutting at but not into the attached hull of the ship. None of these references teach a device by which the welding torch can be aligned repetitively at various angles with a high degree of accuracy. None of these reference teach how a cutting torch can be set to ignite and weld at a predetermined optimal gas and oxygen level without constant adjustment of the cutting torch each time the unit is used.

As such, it is an object of the prevent invention to provide a cutting torch unit capable of cutting a flat-bulb stiffener using a single drive unit.

It is another object of the present invention to provide a cutting torch unit capable of repetitively cutting a beveled edge on a flat-bulb stiffener.

It is another object of the present invention to provide a cutting torch unit capable of cutting a flat-bulb stiffener at the point it meets an attached plate without damage to the attached plate.

It is another object of the present invention to provide a cutting torch unit capable of cutting a flat-bulb stiffener at an angle necessary for joining angled sections of a ship.

It is another object of the present invention to provide a cutting torch unit capable of being quickly and accurately secured to the work piece for precise cutting.

It is yet another object of the present invention to provide a cutting torch unit with a torch that is maintained at an optimal level of cutting efficiency without repetitive adjustment of fuel and oxygen flows each time a cut is made.

It is another object of the present invention to provide a cutting torch unit that is capable of forming a scoop in the bulb end of a flat-bulb stiffener for optimal welding conditions.

It is another object of the present invention to provide a cutting torch unit that is quickly broken down into portable sections for meeting adverse shipyard work conditions.

It is another object of the present invention to provide a torch holder with an alignment mechanism and angle indicia that allow for quick and accurate alignment of the cutting torch.

It is a further object of the present invention to provide a cutting tool that is easy and convenient to carry, handle, and manipulate under shipyard conditions, that is, in cutting bulb-flat stiffeners using scaffolding extending upward 150 feet or more in what is typically a dark and debris laden environment.

Another object of the present invention provides consistent, high quality weld joint parations in a very short time.

It is yet another object of the present invention to provide a beveled edge and scoop area at allow for rapid and convenient access to the joint region during the welding process.

Another object of the present invention is to provide a cutting torch assembly for cutting a variety of structural materials including T- and I-beams.

It is another object of the present invention to provide a means for quickly positioning and moving the track of a track and carriage system with respect to its supporting assembly.

The foregoing and other objects, features and advantages of the invention will become apparent from the following disclosure in which one or more preferred embodiments of the invention are described in detail and illustrated in the accompanying drawings. It is contemplated that variations in procedures, structural features and arrangement of parts may appear to a person skilled in the art without departing from the scope of or sacrificing any of the advantages of the invention.

SUMMARY

To meet these objectives, the present invention features a cutting tool for workpiece cutting that comprises 1) a clamp that is sized to attach to the workpiece, 2) a rotating platform that is rotatably attached to the clamp, 3) a latch with a first latch member attached to the rotating platform and a second latch member latching to the first latch member. Prior to latching, the second latch member as assembled so have to have 1) a track attached to it with a carriage moveably attached to the track , 2) a positioning arm attached to the carriage, and 3) a cutting torch holder attached to the positioning arm. The latching mechanism minimizes weight and bulk during the initial workpiece clamping after which the rest of the cutting assembly cam be quickly latch to the clamped assembly with a minimum of further alignment and setup time.

The invention features a quick acting "Vise-Grip" type clamp to quickly and accurately clamp the cutting tool to the workpiece. The clamp uses a four pivot pin mechanism with a stationary jaw attached to a moveable jaw with a first pivot pin, a connecting handle attached to the stationary jaw with second pivot pin, a moveable handle attached to the connecting handle by a third pivot pin and to the moveable jaw with a fourth pivot pin. This four pin arrangement allows for quick and accurate alignment of the clamp with the workpiece and affords a quick and sure locking clamp.

To adjust the clamp for different workpiece thickness, the clamp features a moveable locking rod that is attached to the moveable jaw of the clamp. The moveable locking rod is locked to the moveable jaw with two nuts. The rotating platform has a hole formed in it for receiving a fixed circular center post projecting upward from the clamp and serving as the center of rotation for the rotating platform. An arcuate slot is formed in the rotating platform for receiving a threaded shaft with an attached handle. The treaded shaft passes through the arcuate slot and into a threaded hole in the clamp and locks the rotating platform to the clamp when it is rotated into the threaded hole using the attached handle. The rotating platform also has a hole in it for receiving a thumb screw that is screwed into a threaded hole in the clamp in order to accurately and quickly set the rotating platform to an exact ninety degree crosscut position.

The track and carriage of the current invention has a track with a housing that has a lead screwed rotatably mounted in it. The lead screw is rotatably driven by a motor attached to it by means of a coupling clutch. The lead screw linearly drives a block with an attached slide. The track also has a U-shape cover attached to the housing to keep dirt and debris from entering into the housing. To achieve protection of the housing and its associated parts, its was necessary to devise a way in which to cover the housing while at the same time driving the moveable carriage with components that has been covered. To this end, a U-shaped carriage was designed and attached to the track slide. The carriage was designed in a U-shape having a U-shaped slot formed in it so that the U-shaped cover would fit into the U-shaped slot. In effect, the housing cover passes through the specially designed U-shaped carriage.

One of the features of the present invention is its application to align and set up the tool using its light weight base. It is too be appreciated that working with a small unit is a lot more convenient than working with a heavy and bulky machine especially on rickety scaffolding under dark and inhospitable conditions. The slam latch makes its possible. It essentially divides the tool into two parts with initial alignment of the entire machine done on the basis of its much smaller clamping portion. Once the base is clamped down, the remainder of the machine can be easily locked into place using the slam latch.

The first part of the latch, i.e., the part associated with the clamp comprises latch member with 1) a hock with an outward facing groove, aid 2) a latch with an outward facing notch. The second latch member comprises 1) a first aperture that receives the hook, and 2) a second aperture that receives the latch, i.e., the hook and latch project into holes in the second member when the second member is latched into place. The first aperture has a pin (rod) passing through it with its ends secured in the latch member. In operation this pin is placed in the groove formed in the hook. The pin and groove combination serves as an axis of rotation as the other end of the second member is rotated down on the latch. The second aperture has a retractable plunger pin projecting into it and secured to the second latch member. The engagement of the plunger pin with the notch in the latch effectively locks (latches) the two latch members together.

Although the slam latch can be securely attached to the track with bolts or other fasteners, this severely limits the operational range of the cutting tool. As such, it was important to devise a simple way to reposition the upper latch member to the track. To this end, a slot was formed in the base of the track. Although only one slot need be used, the second, spaced-apart slot adds strength and rigidity to the entire assembly. A groove was also formed in the upper latch member that aligned itself with the slot formed in the base of the track. A circular passage was formed in the upper latch member at right angles to the groove. A lock plate was constructed with a flange formed at its upper edge at right angles to the body of the lock plate as well as having an aperture formed in it. The lower portion of the lock plate which is opposite the flange, extends through the slot formed in the base of the track until the flange contacts the upper surface of the base of the track. The base of the plate also extends into the groove in the latch member. The plate is moveable lengthwise along the slot. A cam lock is formed as a cylinder with a cam lobe projecting outward from the cylindrical shape of the cam lock. The cam lock is rotatably secured in the passage formed in second latch member. The cam lock is rotatably secured in the passage formed in the upper latch member and passes through the aperture formed in the lock plate. The flange of the lock plate draws the base of the track downward to contact an upper surface of the upper latch member as the cam lobe rotates downward in the aperture formed in the lock plate and urges the lock plate downward to lock the base of the track to the upper surface of the latch member.

The next component of the invention is the positioning arm. Generally the purpose of the positioning arm is to position the torch away from the clamp and track and carriage during the cutting operation so as to avoid damage to these components from the heat and molten metal produced during the cutting process. The positioning arm is made up of a housing that is attached to the carriage. An arm moves into and out of the housing and has a slot formed in its side. A rack is mounted within the arm. The teeth of a pinion gear project through the slot of in the arm and engage the rack teeth. A shaft has the pinion gear attached at one end and a handwheel attached at the other.

When cutting bulb flats at an angle, a straight line cut will leave the lower end of the bulb flat projecting beyond a plane passing through the edge of the cut at the bulb surface. This tends to leave a large between the bulb flat at every position except where the lower edge of the bulbs project outward from the cut and touch each other. As such, it is desirable to move the torch laterally as well as along the direct of cut when cutting the bulb portion. In the past, the only way to achieve both a forward and a lateral cut was with a double drive device, i.e., a track moving the carriage in a first direction while a second carriage moves the torch laterally, typically by moving the first carriage. Thus it is one of the object of the present invention to achieve both forward and lateral movement of the cutting torch using only a single moving carriage.

This was accomplished by using developing a lateral torch position manipulator. Such a manipulator comprises a fixed block (non-moveable) unit attached to the carriage and a cam pattern block attached to the track. A movable block unit has the position arm attached to it and is moveably attached to the fixed block unit. The movable block unit has a cam follower arm with a cam wheel that contacts the cam pattern block. As a result, the movable block unit moves laterally with respect to the fixed block unit in response to the cam wheel following the cam pattern block.

The fixed block unit has a housing; attached to the carriage with stationary end blocks attached to the fixed housing and a stationary spring block also attached to the housing. A rod is attached at one end to the stationary end block and at the other end to the spring block. The fixed block unit also contains a moveable block. The moveable block has a hole formed in it with the rod passing through the hole. Since this is the only restraint on the moveable block and the radius of the hole is larger than the radius of the rod, the moveable block is able to move along the rod between the end block and the spring block. A tension spring is connected at one end to the moveable block and at the other end to the spring block. As a result, the spring pulls the moveable block toward the spring block. Since the moveable block is connected to the moveable block unit by means of a plunger projecting into the moveable block. As a result, any force that tends to move the moveable block outward toward the end block will result in a counter force from the tension spring tending to bull the moveable block unit back toward the track. In effect this is the method by which the cam follower wheel is held against the track and cam block.

As shown in figure twenty, one of the limitations of the present invention is that it is not possible to make angle cuts when the work piece to be cut is attached to a wall. As is evident, rotation of the unit angles the cutting torch way from the wall and bring the positioning arm and corner of the track in contact with the wall on the side opposite to the cut. To this end, it has been found that the installation of a second rotating platform that rotatably attaches the positioning arm to the carriage will eliminate this problem. As seen in figure twenty, rotation of the positioning arm toward the wall on the cutting side will bring the torch to a position where it will be able to completely cut the workpiece without doing damage to the wall.

The second rotating platform comprises to plates, a base plate that is attached to the carriage and a rotating plate attached to the positioning arm with the rotating plate also being rotatably mounted to the base plate by means of a pivot pin. Similar to the first rotating platform, the second platform as an arcuate slot for receiving a handled bolt that is received in a threaded hole in the base plate. The rotating the bolt into the threaded hole, the rotating plate is locked to the base plate. The arcuate slot allows such locking to take place throughout the range of angles through which the positioning arm is turned within the range permitted by the arcuate slot. A spring loaded plunger mounted on the rotating plate engages a hole in the base plate. By placing this hole at zero angle of rotation, it is always easy to return the positioning arm to its non-angled position. Rotational indicia on the rotating platform and a base line on the base which serves as a reference indicator, permits exact angles to be maintained through the job.

Another feature of the present invention torch holder that allows the torch to be manipulated in three directions: angularly into and out of a plane along the cut line, angularly in the plane along the cut line, and linearly in the direction to which the torch is turned. Indicia with respect to both angular manipulations allow torch position to be exactly controlled.

The torch holder is composed of a base plate which is typically attached to the positioning arm and which has a circular recess cut into it. A rotating plate is mounted for rotation in the circular recess and affords rotational positioning of the torch in the plane of the cut.

T two spaced-apart torch clamp brackets are attached at one of each of their ends to the rotating plate with the other end attached to the torch and transfers the rotational motion of the rotating plate to the torch. The torch clamp is also able to pivot in and out of the cutting plane as a result of the fact that the torch clamp is mounted for pivoting on pivot pins mounted in the two spaced-apart torch clamp brackets at the ends opposite the ends of attachment to the rotating plate. A spur gear mounted in the torch clamp engages a rack mounted on the cutting torch to move it in and out of the torch clamp.

Rotation of the rotating plate mounted in the base plate is accomplished by means of a screw that passes through a cylinder moveably mounted in a slot in the rotating plate. As the screw is turned, the cylinder is urged against the wall of the slot causing the rotating plate to turn in that direction. Rotational indicia on the rotating plate align with a pointer in a viewing window in the base plate to give an exact indication of the amount of rotation to which the torch has been subjected and allows for the reproducibility of the cutting process.

As noted the torch rotates into and out of the cutting place as a result of the mounting of the torch holder on pivot pins at the ends of the torch clamp brackets. Pivoting about these pins is accomplished by means of a spur gear mounted in the torch clamp brackets which engages a curved rack mounted in the torch clamp. The torch clamp bracket has angle indicia along the path of the curved rack. A pointer formed in a window of the torch clamp bracket enables exact determination and reproducibility of the requisite angle.

In cutting processes involving structural members such as I- and T-beams, it is oven necessary to move the torch in a variety of directions and at considerable distance from the motor driven carriage. To accomplish such cuts, a second positioning arm may be attached to the first positioning arm, typically at right angles to the first positioning arm. Generally the housing of the second positioning arm is attached to the arm moving in and out of the housing. As with the first positioning arm, the second positioning arm has a housing, an arm moving in and out of the housing, a slot formed in the arm, and a rack inserted into the interior of the arm and accessible by pinion teeth of a pinion mounted in the housing on a shaft driven by a handwheel at its opposite end.

In addition to the extended reach afforded by a second positioning arm, it often is desirable to make cuts in both flanges of an I-beam or to make horizontal cuts in the web of an I- and T-beam, To this end a different type of clamp has been developed as well as a base plate that allows the motor driven carriage to be moved from a vertical to a horizontal position.

To this end, a clamp has been developed for rigidly clamping to both edges of the flange on a T- or I-beam and then having a pivoting plate mounted on the clamp to permit orientation of the motorized carriage in either a vertical or horizontal position. The clamp comprises a base plate formed from a horizontal plate and a vertical plate, a stationary clamping block fixed to the base plate, a moveable clamping block moveably attached to the base plate and urged to and from the first clamping block by means of a threaded rod rotating in a threaded hole formed in a block attached to the base plate.

For vertical and horizontal orientation of the motorized carriage, a pivot hole is formed in the base plate and a pivot plate is attached to the base plate by means of a pivot pin passing through the pivot hole and attached at each end to the pivot plate. The pivot plate moves between vertical and horizontal positions as a result of rotation about the pivot pin.

The pivot plate can be locked in the horizontal position and in the vertical position by means of a first handled pin that engages a hole in the horizontal plate of the base plate to lock the rotating plate to the horizontal plate and by means of a second handled pin engaging a hole in the vertical plate of the base plate to lock the rotating plate to said vertical plate in a vertical position.

Finally it is noted that torch cutting is a difficult art with even the light and adjustment of the proper flow of fuel and oxygen a most difficult task and only correctly done after years of experience. Unfortunately the adjustment process must be done with virtually every cut and even the skilled tradesman, it takes its toll on cutting torch parts and valves. To this end, it has been found that a unique combination of quick acting on-off valves, pressure regulators, and flow control valves virtually eliminate the need for torch adjusting and consistently give high quality torch cuts. To accomplish such consistency a pressure gauge, a flow control valve, and a quick-acting on-off value are used to supply fuel to the torch. The torch valve itself may always be left completely open. Similarly the oxygen supply is first regulated with a pressure gage and then split into two flows, one for heating and one for cutting. The heating flow is next sent through a flow control valve and then to a quick-acting on-off valve. The cutting flow need only be sent through a quick-acting on-off value. Once the pressure and flow control valves have been set, not further adjustment of the fuel and oxygen supply lines need be made. The workman then need use only the three on-off valves (fuel, heating oxygen, and cutting oxygen) for all cutting The foregoing and other objects, features and advantages of the invention will become apparent from the following disclosure in which one or more preferred embodiments of the invention are described in detail and illustrated in the accompanying drawings. It is contemplated that variations in procedures, structural features and arrangement of parts may appear to a person skilled in the art without departing from the scope of or sacrificing any of the advantages of the invention.

BRIEF DESCRIPTION OF THE DRAWINGS

One or more preferred embodiments of the cutting apparatus according to the invention are described by way of reference to the accompanying drawings, in which

FIG. 8 is a schematic drawing illustrating a fuel and oxygen flow system for regulating oxygen and fuel to a cutting torch. A housing for the regulators, throttle valves, and quick acting valves is shown in cross-section.

FIG. 9 is a top view of the latch assembly of the slam latch.

FIG. 10 is a plan side view of the latch assembly shown in FIG. 9.

FIG. 11 is a plan side view of the of the locking plate used with the latch assembly shown in FIG. 9.

FIG. 12 is a plan end view of the locking plate shown in FIG. 11.

FIG. 13 is a partial view of the bottom plate of the track assembly illustrating slots used with the locking plate of FIGS. 11 and 12 and which allow the latch assembly to be moved along the base of the track assembly and locked into place.

FIG. 14 is a cross-section of along 14—14 of FIG. 9 illustrating the use of a cam lock to lock the latch assembly to the base of the track assembly.

FIG. 15 is and end view of the cam lock illustrating the cam lobe and a hexagonal socket for rotating the cam lobe.

FIG. 23 is a top view of a cutting torch holder illustrating rotation into and out of the plane of the base, rotation in a plane parallel to the plane of the base, and linear movement of a cutting torch.

FIG. 24 is a front elevation of the cutting torch holder of FIG. 23.

FIG. 25 is a side elevation of the cutting torch holder of FIG. 23.

FIG. 26 is a perspective view of the cutting torch holder of FIG. 23.

FIG. 27 is a front elevation of the rotation plate of the cutting torch holder of FIG. 23 illustrating plate rotation using a screw, slot, and push cylinder configuration.

FIG. 28 is a side elevation view of the rotation plate of FIG. 27.

FIG. 29 is a side elevation view of the torch clamp of the cutting torch holder of FIG. 23.

FIG. 30 is a clamp for attachment to T- and I-beam workpieces that allows for both horizontal and vertical positioning of the track and carriage assembly.

FIG. 31 is a cross-section along 31—31 of FIG. 30 illustrating the dovetail track of a moving clamping block.

FIG. 32 is a partial schematic drawing illustrating the pivot plate clamping details.

Figure 1:
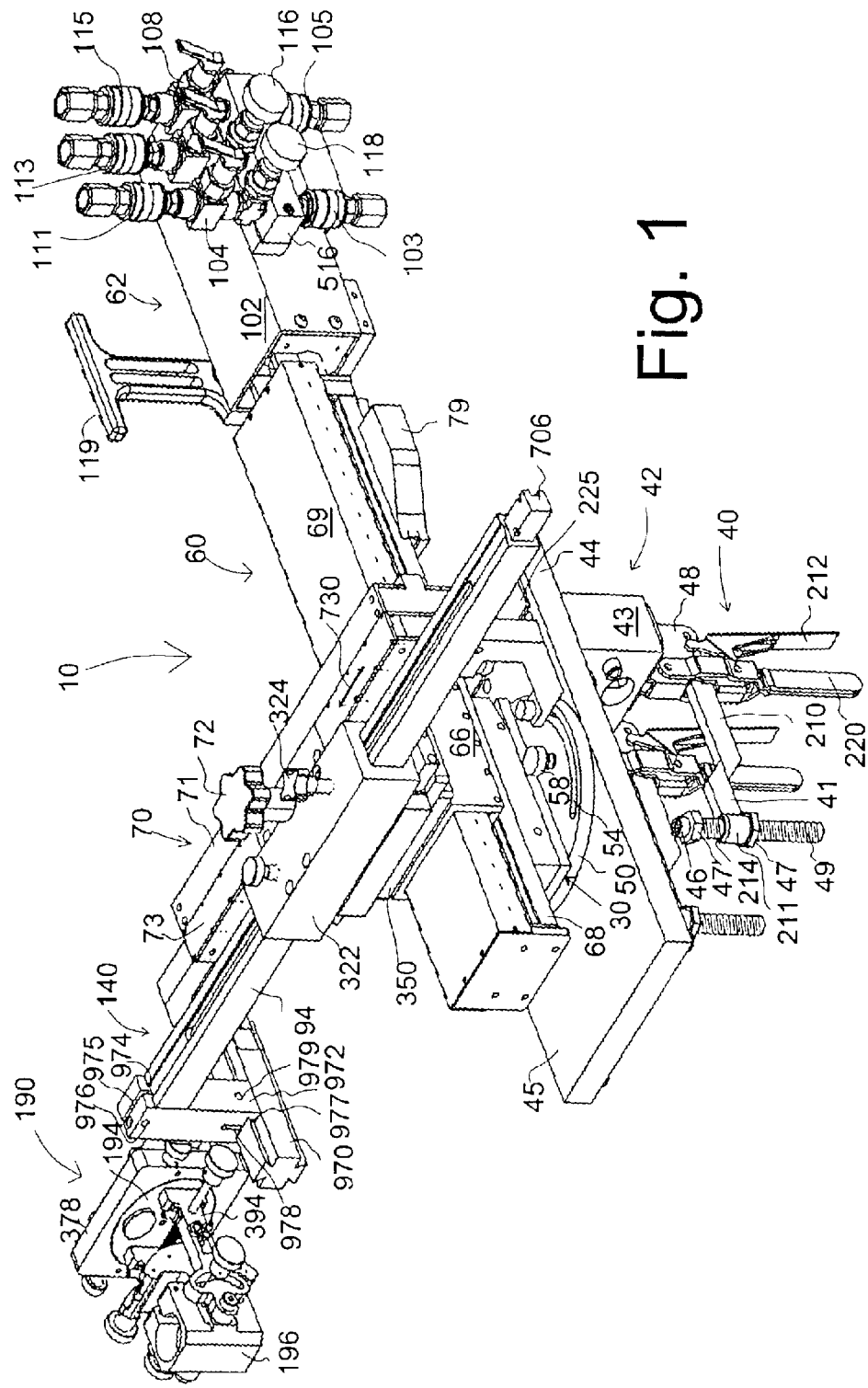
FIG. 1 is a perspective view illustrating the cutting tool of the present invention.

In describing the preferred embodiment of the invention which is illustrated in the drawings, specific terminology is resorted to for the sake of clarity. However, it is not intended that the invention be limited to the specific terms so selected and it is to be understood that each specific term includes all technical equivalents that operate in a similar manner to accomplish a similar purpose.

Although a preferred embodiment of the invention has been herein described, it is understood that various changes and modifications in the illustrated and described structure can be affected without departure from the basic principles that underlie the invention. Changes and modifications of this type are therefore deemed to be circumscribed by the spirit and scope of the invention, except as the same may be necessarily modified by the appended claims or reasonable equivalents thereof.

DETAILED DESCRIPTION OF THE INVENTION

Figure 2:
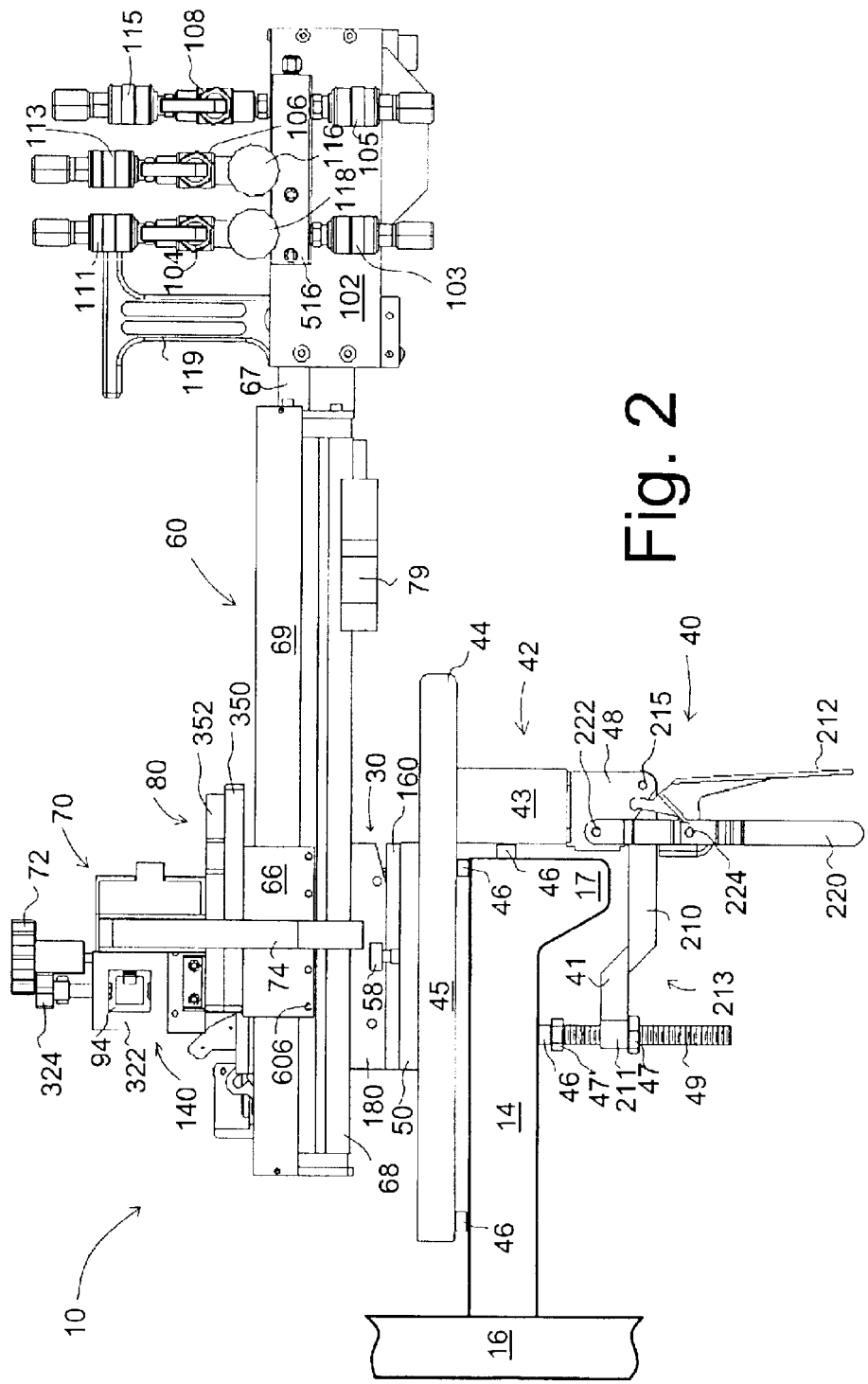
FIG. 2 is a side elevation view of the cutting tool illustrated in FIG. 1 attached to a workpiece.

As shown in FIGS. 1 and 2, the torch cutting tool of the present invention, generally designated by the numeral 10, comprises six subassemblies that provide for accurate torch cutting of supporting and stiffening workpiece such as bulb-flat stiffeners 14 (FIG. 2), I-beams, T-beams, and so forth used in the shipbuilding and other constriction arts. Specifically, these subassemblies are: 1) a clamping assembly, e.g., clamp 40, for securing the device to the workpiece, 2) a rotating assembly, e.g., rotating platform 50, that is rotatably attached to the clamp 40 and provides for making angled cuts of the workpiece, 3) a motorized track and carriage assembly 60 with a track 68 and linearly moveable carriage 66, 4) a latch assembly 30 with a first latch member 160 attached to rotating platform 50 and a second latch member 180 attached to the motorized track and carriage assembly 60 for rapid attachment and detachment of the motorized track and carriage assembly 60 to the clamping assembly 40, 5) a positioning arm 140 that allows for positioning of a cutting torch with respect to the workpiece away from the clamping assembly 40 and the carriage assembly 60, and 6) a torch manipulator assembly 190 that allows for precise positioning of the cutting torch with respect to the workpiece. Positioning Clamp Assembly 40

Figure 3:
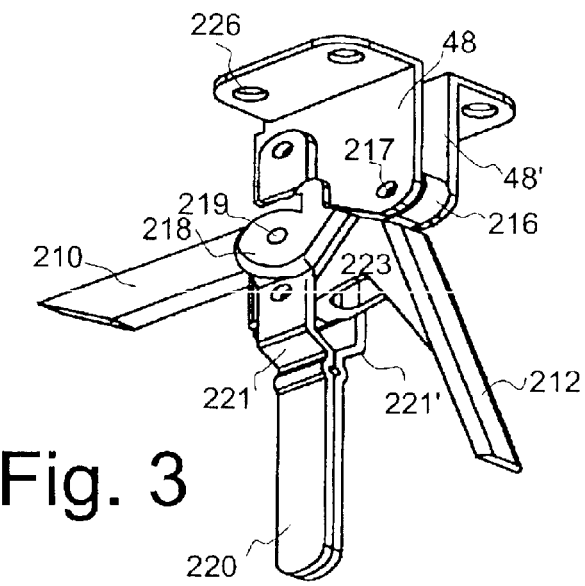
FIG. 3 is a perspective view of a portion of the clamp assembly shown in FIGS. 1 and 2 with a portion of the connecting handle removed.

Referring to FIGS. 1–3, the self-aligning clamp unit 40 is based on conventional, commercially available, ViseGrip type assemblies such as described in U.S. Pat. No. 2,592, 807, all of which is included by reference as if completely written herein. As seen in FIG. 2, the clamp 40 comprises a stationary jaw 42 which is comprised of an upper jaw member 45 to which is rigidly attached side block 43 at its top. Two spaced-apart members 48, 48' (FIG. 3) are rigidly attached to the bottom of side block 43. Securing feet 46 are attached to the underside of upper jaw member 45 and the side of side block 43 for the purpose of engaging workpiece 14.

A moveable jaw 213 is comprised of arm 210 to which is attached a first end of extension arm 41. The opposite end of extension arm 41 terminates in a cylindrical portion 211 having an aperture 214 (FIG. 1) bored therein for receiving a threaded rod 49 which is secured to the cylindrical portion 211 by means of nuts 47, 47'. Threaded rod 49 terminates in securing foot 46 which engages workpiece 14. The space between upper jaw member 45 and the end of rod 49 can be adjusted by selected location of nut 47 on threaded rod 49 so as to engage one end of cylindrical portion 211 followed by tightening of nut 47' to engage the opposite end of cylindrical portion 211 thereby securing rod 49 to arm 41 with the requisite space between the upper end of rod 49 and the bottom of upper jaw member 45. The use of adjustable rod 49 has the advantage of allowing adjustment of the clamp assembly 40 to accommodate various thicknesses of workpiece 14.

The moveable jaw 213 is moveably secured to stationary jaw by means of pivot pin 215. Specifically, the end 216 of arm 210 opposite the end joined to extension arm 41 passes between spaced-apart members 48, 48' (FIG. 3). Pivot pin 215 (FIG. 2) passes through apertures 217 in spaced-apart members 48, 48' and through an aperture formed in end 216 of arm 210 to rotatably secure arm 210 of the moveable jaw 213 to the spaced-apart members 48,48' of stationary jaw 42. Arm 210 of moveable jaw 213 also passes between spaced-apart tangs 218 of moveable clamp handle 212 and is moveably joined to spaced-apart tangs 218 by means of pin 219 which passes through apertures in tangs 218 and an aperture in arm 210. Connecting clamp handle 220 is bifurcated into two spaced-apart arms 221, 221' which are joined at their distal ends to the spaced-apart members 48,48' of stationary jaw 42 by means of pin 222. Arm 210 of moveable jaw 213 and spaced-apart tangs 218 on handle 212 to which arm 210 is attached by pin 219 passes freely between the bifurcated arms 221, 221' of handle 220, i.e, neither arm 210 nor tangs 218 are attached to arms 221,221'. A portion 223 of moveable handle 212 below the line of bifurcation into tangs 218 is pivotally joined to the bifurcated arms 221,221' by means of pivot pin 224.

Upper jaw member 45 extends beyond side block 43 (to the right in FIGS. 1 and 2) and has a rectangular opening 225 (FIG. 5) formed therein to form a handle portion 44 for carrying clamp 40 and also for positioning clamp 40 on workpiece 14. Typically two clamps 40 are mounted to side block 43 by means of machine screws that pass through holes 226 into threaded holes on the underside of side block 43. When handle 212 is opened, i.e., pulled away from handle 220, it rotates about pivot pin 224 and causes moveable arm 213 to rotate about pin 215 in a counter-clockwise manner causing the end of rod 49 (the end with securing foot 46) to retract from workpiece 14. When handle 212 is closed against handle 220, it pivots about pin 224 causing arm 210 to rotate clockwise and bring the end of rod 49 into contact with workpiece 40.

In operation, the device operator moves clamp handles 212 outward to move rod 49 in a downward position to provide sufficient clearance between the end of rod 49 and the upper jaw 45 so as to clear the bulb portion 17 of bulb-flat stiffener workpiece 14. If necessary, rod 49 can be adjusted to provide the correct spacing with upper jaw 45 by repositioning nuts 47 and 47'. The device operator holds the clamp assembly 40 by means of handle 44 formed in upper jaw plate 45 and moves the device inward toward the bulb-flat stiffener workpiece until securing foot 46 on side block 43 engages the edge of workpiece 14. Maintaining the clamp assembly 40 firmly against the edge of the workpiece 14, each of the handles 212 of clamps 40 are closed to move rod 49 in locked position with upperjaw 45. As will be apparent, locking of clamp 40 to the workpiece, properly aligns the remainder of the tool 10 for the cutting operation.

Rotating Platform 50

Referring to FIGS. 1, 2, 4 and 5, a rotating platform 50 rotates with respect to upper jaw 45 about a fixed circular center post 52 that projects upward from upper jaw 45 into a center hole 59 formed in platform 50. Alternatively the center post may project downward from the rotating platform 50 into a circular hole formed in upperjaw 45. Two arcuate slots 54 are formed in rotating platform 50. Handles 56 are attached to threaded posts 55 that pass through arcuate slots 54 and are then screwed into threaded holes 51 in upperjaw 45 and allow for the rotating platform 50 to be quickly and firmly secured in place when the desired rotational setting of platform 50 has been achieved. A thumb screw 58 is screwed into threaded hole 57 in upper jaw 45 to accurately and securely set rotating platform 50 for cross cutting (transverse, 90 degree cutting) of workpiece 14. Alternatively, a spring loaded pin may be used that engages a hole in upperjaw 45 to set the rotational angle of platform 50. The transverse orientation is used for cutting workpiece 14 at a right angle, an orientation typical when workpieces 14 are joined in a straight, end-to-end fashion. For ship-building purposes, bulb-flat stiffeners, (i.e., workpiece 14) are cut in a transverse direction for joining when midship sections of the ship are being assembled. Other angular orientations of rotating platform 50 are typically needed for joining workpieces 14 when ship sections at the bow and stern of a ship are assembled.

Track, Carriage, and Cover Assembly 60

The track, carriage, and cover assembly 60 with associated motor 62 and gear drive 65 is illustrated in FIGS. 1,2, 6 and 7. The basic track 68 and associated slide 61 are shown in semi-schematic fashion in FIG. 7. The track 68 is a common commercial product such as manufactured by Tol-O-Matic, Inc. Of Hamel, Minn. and is typically formed as a hollow elongate beam that has a generally square shaped cross section. Typically slide 61 is attached to a block 502 which is driven by a lead screw 64. Lead screw 64 is journaled for rotation into track ends 506 and 508 and coupled to a motor 62 by means of a reducing gear assembly 65. Additional details as to track assemblies can be found in U.S. Pat. No. 3,450,398 all of which is incorporated here as if completely written herein. A clutch coupling 504 such as made by R&W America, LP is used to prevent damage to motor 62 and/or screw 64 in the event block 502 (and associated attachments, e.g., carriage 66, torch, etc.) is driven to its limits or otherwise encounters an obstruction that causes an over-torque condition. Preferably clutch coupling 504 is a self-resetting type that resets when the over-torque condition is eliminated.

Figure 6:
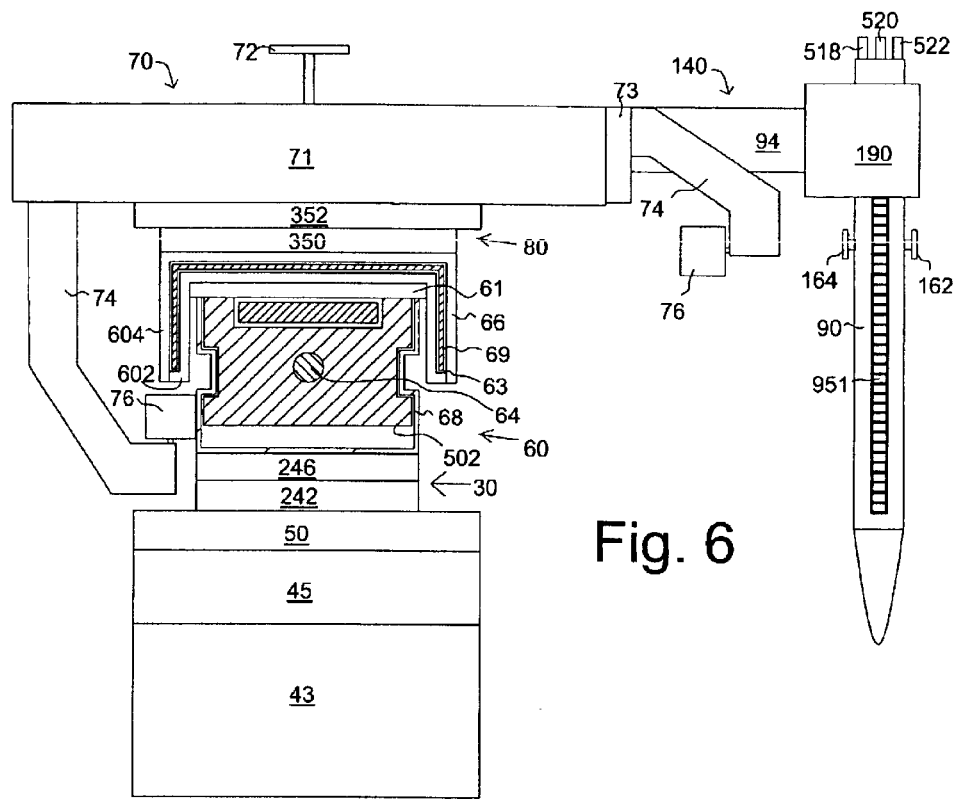
FIG. 6 is a schematic partial cross sectional view showing the cam follower and torch positioning and manipulator assemblies. The track and carriage assembly and cover are shown in cross sectional view. A portion of the clamp, slam latch, and both rotating tables are shown in block form.
Figure 7:
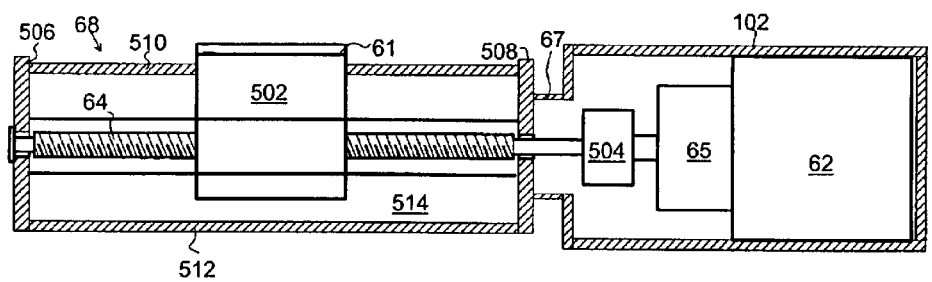
FIG. 7 is a schematic partial cross-sectional view showing the track assembly, lead screw, block and slide. The motor, reduction gears, and over-torque clutch are shown in block form.
Figure 16:
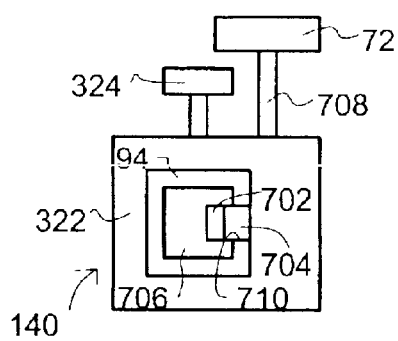
FIG. 16 is an end view of a positioning arm assembly for moving the cutting torch to or away from the track and carriage assembly in a direction that is generally transverse to the travel direction of the carriage.
Figure 17:
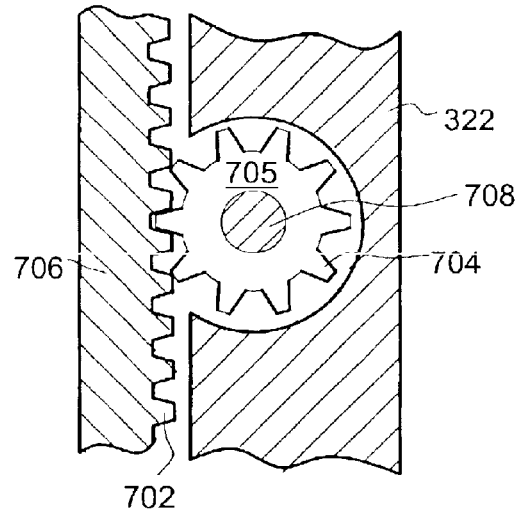
FIG. 17 is a partial cross-sectional view of the rack and pinion assembly used for moving the torch to or away from the track and carriage assembly.

As shown in FIGS. 1, 2 and 7, track 68 and slide 61 are protected by a cover 69 to prevent damage from molten metal and other debris encountered during the cutting operation. Carriage 66 is attached to slide 61 and travels along cover 69 by means of an inverted U-shaped channel 63 that is formed in U-shaped carriage 66. The U-shaped channel 63 is made by formed carriage 66 from two pieces 602, 604 that are fastened together such as with machine screws 606 (FIGS. 2 and 6).

The motor 62 and reducing gear box 65 are standard commercial components. The motor is of permanent magnet DC brush-type construction such as produced by the Baldor Company. The gearbox is a 25:1 reduction gearbox. Motor 62 and gearbox 65 are connected using standard flexible couplings. As shown in FIGS. 1, 2, and 7, motor 62, gearbox 65 and clutch 504 are protected by an aluminum cover housing 102. Various auxiliary equipment such as quick opening fuel and oxygen valves 104, 106, and 108, input connectors 103 and 105, and output connectors 111, 113, and 115 are attached to housing 102 by means of mounting blocks 516. Input connectors 103 and 105 are connected to fuel and oxygen sources via appropriate hoses (not shown). Similarly the output connectors 111, 113, and 115 are connected via hoses to torch 90 via torch input connectors 518, 520, and 522 (FIG. 6) to provide the requisite fuel and oxygen for the heating and cutting operation.

In the past, each torch cut required the adjustment of the torch flame via visual inspection of the flame using torch valves 162 and 164. Unfortunately although a flame might look good, the flow and ratio of fuel and oxygen often are improperly set resulting in a poor cutting job. To avoid this problem and the constant need to adjust flow and fuel and oxygen ratios with each cut, two throttle control valves 116 and 118 are used to set the proper flow and ratio of fuel and oxygen. Use of control valves 116 and 118 (FIGS. 1 and 2)

virtually eliminates all adjustment of fuel and oxygen supply (and associated wear and tear on the torch control valves 162 and 164) and insures the proper ratio of gas and oxygen to do a good cutting job with each and every cut. In operation, the torch valves 162, 164 (FIG. 6) are completely opened. Quick acting valves 104 and 106 are also opened and the correct flame obtained using throttle valves 116 and 118. Thereafter, the flame need not be readjusted. All that need be done is to open quick acting valves 104 and 106, light the torch, and commence the heating and cutting operation. A handle 117 is attached to housing 102 to facilitate carrying and mounting to the clamp assembly 40.

A fuel and oxygen supply unit 110 is shown schematically in FIG. 8. As shown, fuel is input via line 442 with pressure controlled by pressure regulator 444 after which it is sent via line 446 to throttling valve 448 and then to quick acting valve 452 from which it is sent to torch 450 via line 454. Oxygen is input via line 420 with pressure controlled by means of pressure regulator 422. After leaving regulator 422, the output 424 is divided into two flow paths, 426 and 428. The flow in line 426 is sent to metering valve 430 and then to quick acting valve 432 from which it is sent to torch 450 via line 434. Oxygen in line 428 (cutting oxygen) is sent directly to quick acting valve 436 and then to the cutting torch 450 via line 438. For consistency of the pre-heat flame among a variety of torches, it has been found preferable to control the flow of fuel and oxygen only to the pre-heat gas-oxygen mixture.

As shown in FIG. 8, the pressure control gauges 442, 444, the throttle values 430, 448, and quick acting valves 434, 438, and 454 may be mounted in protective box-shaped housing 524 with handle 117 and recessed ends 526, 528 that protect hose connections from damage. However, it has been found that it is preferable to mount the throttle valves 116, 118, quick acting valves 104, 106, 108, and input and output connectors 103, 105 and 111, 113, 115, respectively, on the motor housing 102 as shown in FIGS. 1 and 2 for ease of hookup, lack of possible hose entanglement with the cutting equipment and ready access to fuel and oxygen control functions. Pressure regulators 422, 444 continue to be placed in housing unit 524 to prevent damage and accidental change of the regulators. Finally it is to be noted that the motor 62 is connected to a source of electric power and suitable switches are provided for operator control of the motor starting, stopping, and reversing functions.

At the start of the work shift and with reference to FIGS. 1, 2, and 6, the cutting torch operator opens torch valves 162, 164 (FIG. 6) and the quick acting valves 104, 106 and 108 to their full open position and then sets the pressure valves 422, 444 (contained in regulator unit 110) according to the pressure of the oxygen and fuel supply pressures. He or she then sets the flow control (throttle) valves 116, 118 for the proper flow of fuel and oxygen. After the optimum flow is achieved, quick supply valves 104, 106, and 108 are closed. From that point on, the torch flame is completely controlled by quick acting valves 104, 106 and 108. For each cut, the operator opens the quick acting fuel valve 104 to its full open position, lights the torch, and opens the quick acting oxygen valve 106 to its fill open position. The torch is ready to preheat the work piece without further adjustment. After initial preheating, the cutting oxygen valve 108 is fully opened and the cutting operation carried out with out further adjustment of the torch. After the cut, quick acting vales 104, 106, and 108 are closed. The heating and cutting process, using only quick acting valves 104, 106 and 108 is repeated for every cut without need for cutting flame adjustment. As should be readily apparent, traditional torch valves 162, 164 can be eliminated when using the present combination of fuel and oxygen controls and valves.

Slam Latch Connecting Device 30.

Figure 4:
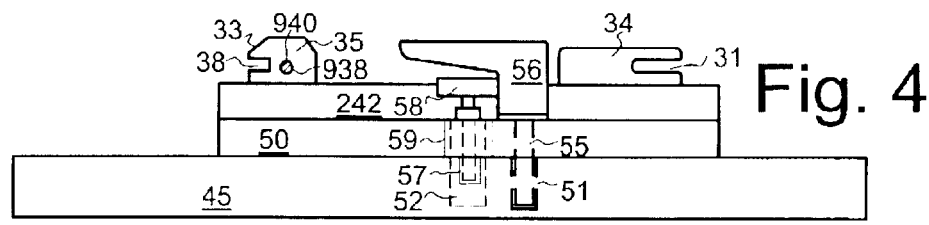
FIG. 4 is a side elevation of the upper jaw member, rotating platform, and the base of the slam latch.
Figure 5:
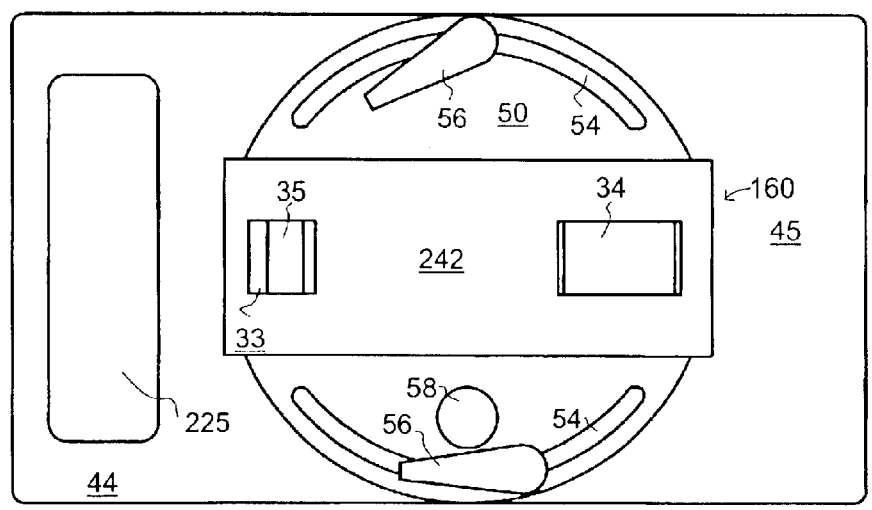
FIG. 5 is a top view of the upper jaw member, rotating platform and the base of the slam latch.

As seen in FIG. 2, the slam latch device 30 comprises a base unit (a first latch member) 160 and a latch unit (second latch member) 180 and allows the motorized track and carriage assembly 60 to be rapidly and securely attached to clamp assembly 40 (via rotating platform 50) after the clamp assembly 40 has been positioned and secured to the workpiece 14. As seen in FIGS. 4 and 5, the base unit 160 comprises an oblong plate 242 with a hook 34 mounted toward one end and a latch 35 mounted toward the other end. The hook 34 has an outward facing rounded groove 31 for receiving pin 36 mounted in an opening 39 formed at one end of latch unit 180 (FIG. 9) Latch 35 has an outward facing rectangular notch 38 formed in it for receiving latch pin 32. Latch 35 has an outward facing downward ramp surface 33 formed in its upper region for facilitating the latching of latch pin 32 in notch 38. Base plate 242 is mounted to rotating platform 50 by means of recessed bolt that are screwed into threaded bolt holes in rotating platform 50. However, it is to be realized that other forms of attachment may be used.

As seen in FIGS. 9 and 10, latch unit 180 comprises an oblong block 246 with two oblong rectangular apertures 39 and 248 formed at opposite ends and which are of sufficient size to accept hook 34 and latch 35 in their entirety. A force fit pin 36 is received in hole 250 formed in block 246 and passes through rectangular aperture 39. A hand-retractable spring loaded plunger 256 (Carr Lane Manufacturing) is screwed into a treaded aperture at the end of oblong block 246 with the plunger pin 32 extending into rectangular aperture 248. A handle 258 can be attached to plunger 256 to facilitate retraction of plunger pin 32 necessary to release the latch unit 180 (and its attached motorized track and carriage assembly 60) from the base unit 160. An inclined surface 252 (FIG. 10) is formed in the end of oblong block 246 (the end containing pin 36) to facilitate engagement of pin 36 with hook 34.

In operation, pin 36 in the rectangular opening 39 of latch unit 180 is engaged in the rounded groove 31 of hook 34 by raising the opposite end of latch unit 180 and pulling pin 36 into groove 31. Such engagement is facilitated by inclined surface 252. After pin 36 is engaged in groove 31, the latch unit 180 is rotated downward about pin 36. Near the end of such rotation, latch pin 32 engages ramp surface 33 and is forced into retraction until it clears the bottom of ramp surface 33 at which point the spring loaded pin is forced into engagement with notch 38 to firmly lock the motorized track and carriage assembly 60 (attached to latch unit 180) to the clamp assembly unit 40. That is, the first latch member 160 (which is attached to rotating platform 50 which is in turn mounted on jaw member 45 of clamp 40) is secured to the second latch member 180 (which is attached to the track 68 or track and carriage assembly 60).

Latch unit 180 can be secured to track unit 68 by means of bolts that pass through the base 512 of track unit 68 and which are screwed into threaded holes on the top surface of block 246. However, it has been found advantageous to use a moveable attachment means for securing the base 512 of track unit 68 to latch member 180. Such moveable locking attachment has the advantage of almost doubling the linear reach of the torch parallel to the track unit 68. The moveable locking attachment is illustrated further in FIGS. 9–15. Specifically two parallel grooves 927 are formed lengthwise in oblong block 246 to moveably receive the base of locking plate 922. As seen in FIGS. 11 and 12, locking plate 922 has a flange 923 formed at its top and an aperture 925 formed in its side.

As seen in FIG. 13, two spaced-apart parallel slots 930 are formed along the length of the base 512 of track assembly 68. The distance between slots 930 and their width are essentially the same as grooves 927 in plate 246. The slots 930 are sufficiently wide to moveably accept the base portion of locking plate 922 but are narrower than the width of locking plate flange 923 as is apparent in FIG. 14.

A passage 931 is formed through the side of block 246 at right angles to the parallel grooves 927. As seen in FIG. 14, the lower portion of locking plate 922 is passed through slots 930 in base plate 512 and then into grooves 927 formed in block 246. A cam lock 924 with cam lobe 928 is placed within passage 931 and passes through aperture 925 in locking plate 922. When the cam lock 924 is rotated within passage 931 about its axis 937 using an allen wrench to engage hex socket 929, the cam lobe 928 contracts the bottom of aperture 925 in plate 512 and forces the locking plate 512 downward in grooves 927 as the cam lobe 928 moves to its downward position. As the flange 923 is forced downward by cam lobe 928, flange 923 securely locks plate 512 to the top of block 246 thereby immovably securing track 68 to latch member 180. As the cam lobe 928 is rotated upward, locking plate 922 moves upward and releases base plate 512 from its locked position with the top of block 246. In the unlocked (upward cam lobe position), track 68 can be moved easily and quickly to any position along the length of slots 930. A set screw 932 screwed into a threaded bore 933 in the top of block 246 engages a radial circular groove 935 about cam lock 924. The set screw 932 is used to adjust the position of the axis of cam lock 924 and prevents cam lock 924 from moving too far upward within passage 931 thereby preventing sufficient downward travel of locking plate 922 to lock base plate 512 to the top of block 246 with flange 923. Axially aligning holes 239 and 238 may be bored in block 246 (FIG. 10) and latch 35 (FIG. 4), respectively. A locking pin 240 (FIGS. 4 and 10) may be passed through holes 238 and 239 and secured as a safely lock in the event plunger pin 32 should ever be accidentally disengaged.

Torch Position Arm Unit 140

As seen in FIGS. 1 and 6, in its simplest form, torch position arm unit 140 comprises an arm 94 with a torch manipulator (holder) 190 attached to one end with the other arm attached to carriage 66 transverse to the direction of carriage travel. The arm 94 serves to locate the torch to the side of and away from the track and carriage assembly in order to avoid damage from the heat and debris generated during the cutting operation.

Since it is often desirable to position the torch 90 (FIG. 6) at varying distances from the track and carriage assembly 60, the torch position arm unit 140 is typically formed as the rack and pinion assembly shown in FIGS. 1, 2, 16, and 17. The torch position unit 140 comprises a housing 322 of essentially hollow square cross section. Torch holding arm 94 is also of hollow square-cross section with a slot 710 formed in one side and fits within the hollow interior of housing 322 and is moveable in and out of the ends of housing 322. A gear rack 706 is rigidly affixed within the hollow interior of holding arm 94 with gear teeth 702 accessible through slot 710. A pinion gear 705 is housed in an opening 712 formed in housing 322 and positioned so that its teeth 704 engage the teeth 702 or rack 706. Pinion gear 705 is attached to shaft 708 which is journaled into housing 322 for rotation using hand wheel 72. Rotation of handwheel 72 causes pinion gear 705 to rotate and move rack 706 and attached arm 94 in and out of housing 322 to locate the cutting torch at a selected distance away from the clamp and track and carriage assemblies, 40 and 60, respectively. When the cutting torch 90 is located in its desired position using handwheel 72, it is locked into place using locking wheel 324.

Although housing 322 can be mounted directly to carriage 66, it is often desirable to provide additional location manipulation capabilities to the cutting torch. As a result and as will be discussed in more detail below, a torch position control unit (cam follower assembly) 70 can be used to automatically control the transverse position of the cutting torch with respect to the carriage travel direction. In such an instance, the positioning arm assembly 140 may be mounted to a lateral torch position manipulator 70 (FIG. 2). Also in some cases as when making angled cuts of a workpiece 14 that is attached at a right angle to a structural panel 16, rotation of track and carriage assembly may make it impossible to cut the workpiece in the region of the structural panel. To overcome this problem a second rotating platform 80 may be used in which case the positioning arm assembly may be attached directly to the rotating platform 80 or to the cam follower assembly 70 which in turn is attached to the second rotating platform 80.

Lateral Torch Position Manipulator 70.

Typically when cutting thick materials that are to be welded together, it is desirable to angle the cut away from the abutting edges at the top to form a "scoop" for holding filler material during the welding process. In a scoop formation, the abutting edges are closest together at the bottom. The scoop provides good visibility to the bottom of the material and allows the initial weld to close (join) the close abutting edges at the bottom of the scoop. Once the bottom portion of the edge is joined, molten filler material can be built up in the scoop with minimal loss of molten material. Unfortunately, when a straight cross-cut of a bulb flat stiffener 14 (FIG. 2) is made with an angled torch, the cut at the base of the bulb 17 projects beyond a vertical transverse plane passing through the line of the cut at the top of bulb-flat stiffener 14. When two such transverse, angled cut stiffeners are brought together for joining, only the very bottom portion of the bulbs abut each other with a large gap existing between the flat area of stiffener 14. Such a gap must be filled with filler material resulting in heavy losses of molten filler and large amounts of time consumed in filling and closing the gap between the flats. To avoid, this problem the cutting torch must be moved in a transverse direction, i.e., away from the plane of the cross cut, when the bulb portion 17 of the bulb flat stiffener 14 is cut. To remedy this problem during the automated cut of stiffener 14 using the motorized track and carriage assembly 60, a special lateral torch manipulator 70 has been devised that allows for lateral retraction of the torch while cutting the bulb portion using only a motorized carriage operating in a single direction.

The lateral torch manipulator 70 is illustrated in FIGS. 1, 2, 6, 18 and 19. The lateral torch manipulator 70 consists of a fixed block unit 71 that is secured to carriage 66 and a moveable (sliding) block unit 73 that moves parallel to the fixed block unit 71, that is, fixed block unit 71 is mounted transverse to track 68 and fixed with respect to carriage 66 while sliding block unit 73 moves transversely to track 68 as shown by arrow 730 in FIG. 1. A cam follower arm 74 attached to the sliding block 73 and having associated cam wheel 76 follows track 68 and cam pattern block 79 attached to the bottom plate 512 (FIG. 7) of track 68. The cam pattern block 79 moves the torch in a lateral direction with respect to the cutting direction produced by carriage 66 to produce the proper scoop pattern and proximity of the bottom edges of two cross-cut bulb-flat stiffeners 14.

Figure 18:
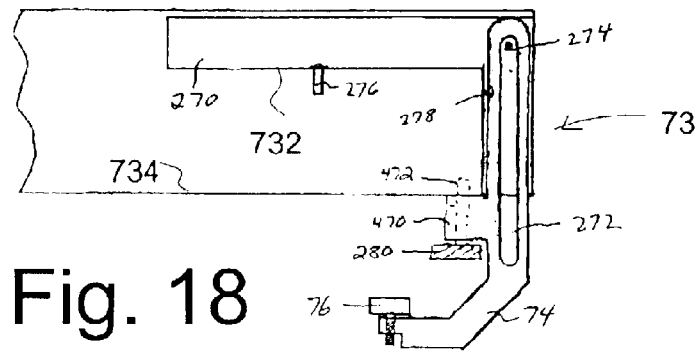
FIG. 18 is a partial front elevation view of a sliding block unit illustrating retraction of cam follower arm in the sliding block unit.
Figure 19:
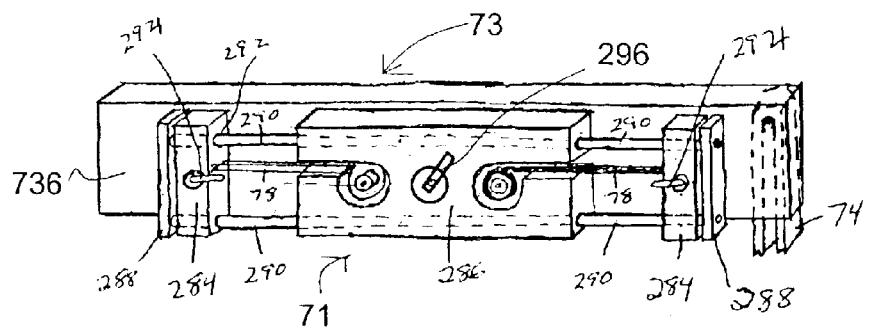
FIG. 19 is a partial perspective view of a stationary block unit and a sliding block unit illustrating a spring mechanism for maintaining the cam follower arm in contact with the cam follower block.

FIG. 18 is a partial view of the sliding block unit 73 with the front cover removed to illustrate cavity 270 which is formed in sliding block 73 to accept a portion of cam follower arm 74 when in a retracted position as shown on the right side of block unit 73 in FIG. 6. For retraction purposes, cam follower arm 74 has a slot 272. A pin 274 passing through slot 272 secures the cam follower arm 74 to the sliding block 73 and allows for cam follower arm 74 to be retracted in and extended from sliding block 73. A spring loaded detent 276 secured in plate 732 of sliding block 73 and an indent 278 formed in cam follower arm 74 maintains the cam follower arm in the retracted position. A spring loaded plunger 280 mounted in the shoulder 470 of the cam follower arm 74 engages a hole 472 in bottom plate 734 of sliding block 73 to secure the cam follower arm 74 in use position. As cam wheel 76 follows track 68 and cam pattern block 79, the offset sideways motion of the cam pattern block 79 is translated into sideways motion of the cutting torch 90 by means of the mechanism illustrated in FIG. 19, it being realized that torch 90 is mounted to arm 94 which is locked in position with locking wheel 324 and that the housing 322 of positioning arm assembly 140 is immovably secured to sliding block unit 73.

Sliding blocks 284 of stationary block 71 are immovably attached to the cover plate 736 of sliding block 73 by means of spring loaded plungers 294. When a cam follower arm 74 is placed in operation, block 284 on the side of the cam follower arm 74 is locked in position with respect to sliding block 73. Block 284 on the opposite side is not secured to sliding block 73 and is drawn up to the end of block 286 by spring 78. Block 286 is immovably secured within stationary block unit 71 as are end blocks 288. Rods 290 are force fit into holes in blocks 286 and 288. Blocks 284 have holes 292 formed in them that allow blocks 284 to slidably move along rods 290. To maintain follower wheel 76 in contact with the track and cam pattern block 79, spring 78 is secured to stationary block 286 and to moveable block 284. Thus as the sliding block 73 to which block 284 is immovably attached moves transversely in response to cam pattern block 79, spring 78 urges sliding block 73 in the opposite direction to maintain the cam wheel 76 in contact with track 68 and cam block 79. Spring loaded plunger 296 allows the sliding block 73 to be locked into position with stationary block 71 when transporting the unit or when cam follower action is not desired.

Housing 322 for the positioning assembly 140 is immovably attached to sliding block 73. The rack 706 is mounted within torch holding arm 94. Typically when the cam follower assembly 70 is used to control the lateral position of torch 90, the torch holding arm 94 is locked into immoveable position by means of locking wheel 324. However, in certain instances when it is desirable or necessary to control lateral movement of torch 90 manually, the locking wheel 324 is used to release the torch holding arm 94 and the lateral torch position can be controlled manually by means of hand wheel 72 which retracts or extends arm 94 by means of the rack and pinion assembly.

To use the lateral torch position manipulator 70, the cam follower arm 74 on the side opposite torch 90 is withdrawn from its holding cavity 270 in sliding block 73 and pivoted downward about pin 274 to bring the cam follower wheel 76 in position against track 68. Arm 74 is secured in its down position as a result of plunger 280 engaging hole 472 in bottom plate 734. The sliding block 73 is released from its locked position with stationary block 71 by releasing plunger 296. Block 284 is positioned over a hole in cover plate 736 of sliding block unit 73 and locked into place with spring loaded plunger 294. Cam follower wheel 76 is held in place against track 68 and cam pattern block 79 by means of the tension produced by spring 78. As the cam follower wheel is driven over the cam pattern block 79 as a result of the movement of carriage 66, it displaces the sliding block 73 in a lateral direction which in turn produces a similar lateral displacement at torch 90 to produce the proper scoop and abutting lower edge in bulb-flat stiffener 14.

Second Rotating Platform 80

Figure 20:
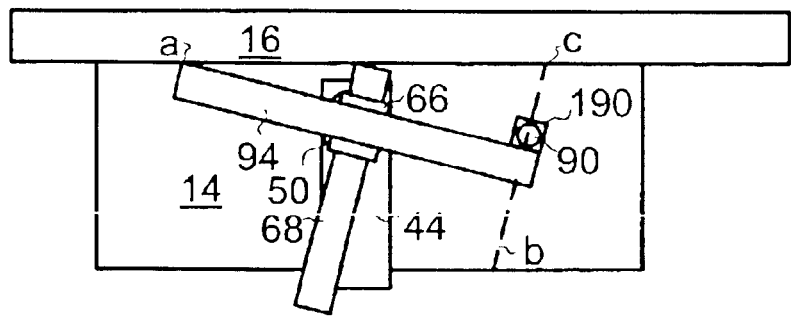
FIG. 20 is a schematic view of the present invention illustrating the inability to perform an angled cross-cut of a workpiece attached to a vertical wall using only a single rotating platform.

As seen in FIG. 20, when the first rotating platform 50 is rotated to make an angled cut b across the end of flat-bulb stiffener 14, it is found that the torch 90 no longer reaches to wall 16, i.e., to point c, to make the desired cut. As is apparent, rotation of platform 50 brings the end of positioning arm 94 in contact with wall 16 at point a.

Figure 21:
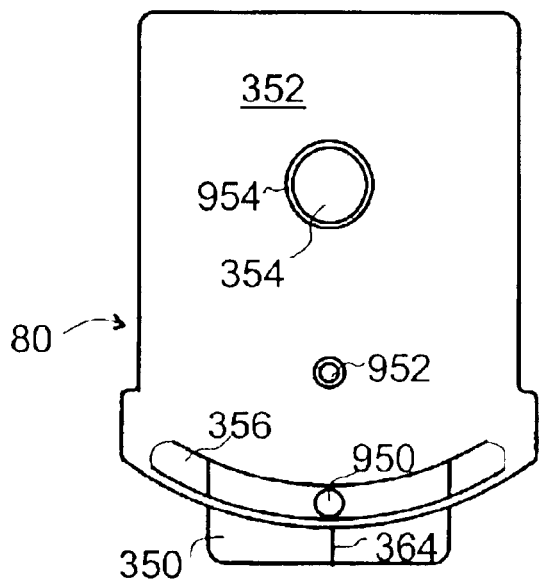
FIG. 21 is a top view of a second rotating platform illustrating rotation of a rotating plate with respect to a base plate using a pivot pin.
Figure 22:
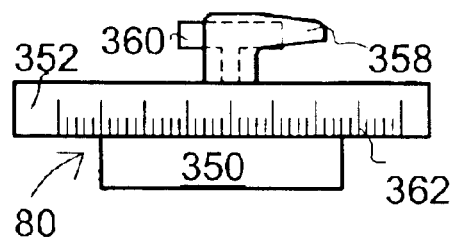
FIG. 22 is a front elevation view of the second rotating platform of FIG. 21 further illustrating angle indicia, a plunger pin for locating a perpendicular orientation, and a locking handle for securing the rotating plate to the base plate.

In order for the torch 90 to reach the hull or bulkhead at point c to initiate the cut, a second rotating platform 80 is used (FIGS. 2, 6, 21 and 22). The second rotating platform 80 comprises a base plate 350 that is mounted to carriage 66 with suitable fasteners. A rotating plate 352 is moveably secured to the base plate 350 by means of pivot pin 354 (FIG. 21). An arcuate groove 356 accepts a handled bolt 358 that is received in a threaded hole 950 in base plate 350 and allows the rotating plate 352 to be secured at a desired angle by turning the handle of handled bolt 358. A spring loaded plunger 360 allows the rotating plate 352 to be locked at zero degrees of rotation on entry of the plunger pin into a hole 952 in base plate 350. Rotational indicia 362 on rotating plate 352 and a reference indicator such as line 364 on the base plate 350 allow for accurate and repeatable setting of the angle of rotation of rotational plate 352.

Torch Holder 190

As shown in FIGS. 23–29, the present invention features a torch holder 190 for rapid, exact, and reproducible settings of the position of torch 90 (FIG. 6). Torch holder 190 is small, light weight and provides precise and accurate torch position adjustment in three axes. Torch 90 has a gear rack 951 (FIG. 6) attached to it that allows for z-axis adjustment by means of a spur gear 391 located in the spur gear cavity formed in spur gear housing 370. The torch gear rack 951 is accommodated in key way 206 when torch 90 is positioned in torch clamp aperture 208. Holes 376 in torch clamp 196 accept bolts 381 which tighten to hold torch 90 in place. Rotary disk 194 provides the appropriate work (bevel) angle for the cut. As seen in FIG. 26, rotary disk 194 is mounted in a circular recess 383 in base 378 and rotates about a pivot bolt 387 passing through an aperture in base mounting block 378 and aperture 382 in disk 194. Indicia 386, formed on the interior surface of circular rotary disk 194, are visible through base plate window 384 and set by means of pointer 388. A threaded hole 390 receives a handled locking bolt 393 that locks the rotating disk 194 at the desired angle. Arcuate slot 392 receives the locking bolt 393 and allows for rotation of the locking bolt 393 when adjusting the working angle of the torch. The rotating disk 194 is rotated by means of a screw adjuster 395 that passes through apertures formed in the sides of mounting block 378 and through threaded aperture 398 (FIG. 28) in push cylinder 396. The axis of push cylinder 396 is placed transverse to the plane of the surface of rotary disk 194 (parallel to its rotational axis) in slot 408 and moves up and down in slot 408 as the rotational angle is changed using the screw adjuster 395 with adjuster knob 389.

Torch clamp 196 pivots about a pivot bolt 230 in hole 201 allowing the travel angle to be adjusted as a result of the curved rack 198 mounted in rack housing 370 which is driven by pinion gear 200 which in turn is driven by pinion gear 202 which provides fine adjustment to the travel angle. Pinion gear 202 is mounted on shaft 204 which has an attached knob 207 for thumb-knob adjustment. Angle indicia 203 printed on the circular rack housing 370 can be accurately set using angle indicator 205 in viewing window 271 of clamp bracket 394. Set screws 374 in clamp bracket 394 contact the circular rack housing to control the force necessary to reposition the travel angle. Arcuate slot 377 accepts the shaft 397 of spur gear 391 mounted in hole 192 and allows for adjustment of torch 90 by means of gear rack 951.

A positioning arm clamp 960 is attached to base 378 by means of bolts 962. The end 966 of a positioning arm is held in the clamp by means of bolt knob 964.

Multipurpose Cutting System

It is to be realized that the clamping and cutting system detailed above was designed for bulb-flat cutting operations. In order to make the tool, more versatile, modifications have been made to the general configuration described above.

As seen in FIGS. 30–32, a clamp 750 is configured to comprise: 1) a base plate 751 formed from a horizontal plate 752 and a vertical plate 758. A V-shaped clamping block 754 is affixed to the horizontal plate 752 and the vertical plate 758. A second V-shaped clamping block 756 is formed with a dovetail 776 that slidably engages a dovetail groove 774 formed in horizontal plate 752. The end of threaded rod 772 to rotatably attached to clamping block 756 and passes through a threaded hole in block 768 that is attached to horizontal plate 752. A handle 770 is affixed to the other end of threaded rod 772 and on rotation causes clamping block 756 to move along dovetail slot 774. As shown, V-blocks 754 and 756 are placed on opposite edges of flange 777 and handle 770 turned to bring blocks 754 and 756 in clamping engagement of flange 777.

A pivot plate 780 is mounted to the base plate 751 by means of a pivot pin 782 that passes through hole 760 formed in horizontal plate 752 so as to be moveable from a horizontal position to a vertical position,. Handled pins 784, 785 lock the pivot plate 780 in either a horizontal or vertical position. In the horizontal position, handled pin 785 engages hole 762 to lock the pivot plate in a horizontal position. In the vertical position, handled pin 784 engages hole 764 in vertical plate 758 to lock the pivot plate 780 in a vertical position. It is to be realized that terms such as "horizontal" and "vertical" are used for descriptive purposes and are not limiting as the cutting system may be used in any orientation.

In operation, a torch mounted to the positioning assembly 140 will cut flange 777 as the motorized track and carriage moves the torch in a horizontal fashion, i.e., parallel to the horizontal movement of the carriage along its track. When the pivot plate 780 is moved to the vertical position, the carriage moves in an up and down (vertical) direction as it travels along its track. A torch mounted to the positioning assembly 140 would cut the web 779 of the workpiece I-beam 775 in a vertical direction. If the track assembly 60 is rotated ninety degrees when the pivot plate 780 is in the vertical position, the track is parallel to the web of the beam and a torch would cut the web in a horizontal direction (parallel to the beam rather than across it) as the carriage moves along its track.

Figure 33:
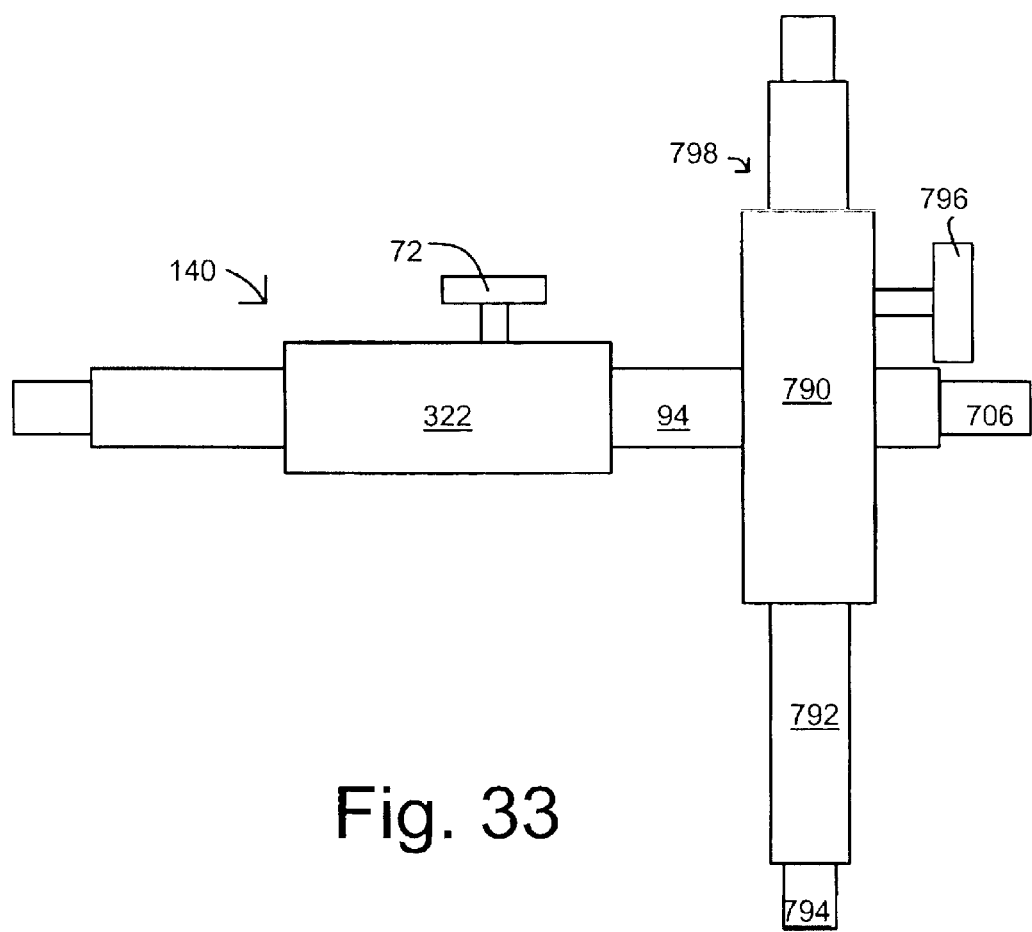
FIG. 33 is a partial schematic drawing illustrating the use of two cutting torch positioning assemblies.

To cut the lower flange 778, the carriage must move transversely across the beam. However as configured in FIG. 32, a torch would not extend downward sufficiently to cut the lower flange. To this end, another positioning assembly 798, similar to assembly 140 previously described, can be attached to torch holding arm 94 by attaching housing 790 to arm 94 as shown in FIG. 33. Housing 790 contains the torch holding arm 792 and moves it in a vertical (up and down direction) by means of a rack 794 driven by a pinion attached to handwheel 796. Although torch holder 190 can be attached directly to the end of the rack 794 by means of clamp 960 attached to the base 378 of torch holder 190, it often is desirable to further extend the end of the torch holding arm 792. As seen in FIG. 1, this can be accomplished by dovetail rails 970 and clamping bars 972. Clamping bar 972 has a slit 975 and square opening 974 in one end that accepts the square configuration of rack 706. The clamping bar is tightened onto rack 706 by means of a bolt in hole 976. The opposite end of clamping bar has a slit dovetail groove 977 that accepts the dovetail of rail 970 and is held in place by means of a bolt in hole 979.

It is therefore understood that although the present invention has been specifically disclosed with the preferred embodiment and examples, modifications to the design concerning sizing, shape, and selection of components for a particular cutting task will be apparent to those skilled in the art and such modifications and variations are considered to be equivalent to and within the scope of the disclosed invention and the appended claims.

Various changes in configurations to other than those shown can be used but that which is shown is preferred and typical. Without departing from the spirit of this invention, various means of fastening the components together may be used.

What is claimed is:

1. A cutting tool for cutting a workpiece comprising:
   a) a clamp sized to attach to said workpiece;
   b) a rotating platform, rotatably attached to said clamp;
   c) a latch comprising:
      1) a first latch member attached to said rotating platform;
      2) a second latch member latching to said first latch member;
   d) a track attached to said second latch member;
   e) a carriage moveably attached to said track;
   f) a positioning arm attached to said carriage; and
   g) a cutting torch holder attached to said positioning arm.

2. The cutting tool according to claim 1 with said clamp comprising: a stationary jaw attached to a moveable jaw by a first pivot pin, a connecting handle attached to said stationary jaw by a second pivot pin, and a moveable handle attached to said connecting handle by a third pivot pin and attached to said moveable jaw by means of a fourth pivot pin.

3. The cutting tool according to claim 2 with said moveable jaw having an attached, moveable locking rod for controlling the distance between said stationary jaw and said moveable jaw.

4. The cutting tool according to claim 3 wherein said moveable locking rod is locked to said moveable jaw with two nuts.

5. The cutting tool according to claim 1 with said rotating platform having a hole formed therein for receiving a fixed circular center post projecting upward from said clamp and serving as the center of rotation for said rotating platform.

6. The cutting tool according to claim 1 with said rotating platform having at least one arcuate slot formed therein for receiving a threaded shaft with an affixed handle, said treaded shaft passing through said arcuate slot and into a threaded hole in said clamp, said threaded shaft fixing said rotating platform to said clamp when turned into said threaded hole with said affixed handle.

7. The cutting tool according to claim 1 with said rotating platform having at least one hole formed therein for receiving a thumb screw that is screwed into a threaded hole formed in said clamp.

8. The cutting tool according to claim 1 with said track comprising a housing having a lead screwed rotatably mounted therein, said lead screw:
   a) rotatably driven by a motor attached thereto by means of a coupling clutch; and
   b) linearly driving a block with an attached slide.

9. The cutting tool according to claim 8 with said track further comprising a U-shape cover attached to said housing.

10. The cutting tool according to claim 9 wherein said carriage is a U-shaped carriage attached to said slide, said U-shaped carriage having a U-shaped slot formed therein with said U-shaped slot accepting said U-shaped cover and moving linearly along said U-shaped cover.

11. The cutting tool according to claim 1 with
   a) said first latch member comprising:
      1) a hook with an outward facing groove, and
      2) a latch with an outward facing notch; and
   b) said second latch member comprising:
      1) a first aperture formed therein for receiving said hook;
      2) a second aperture formed therein for receiving said latch;
      3) said first aperture having a pin passing there through and secured to said second latch member, said pin engaging said groove in said hook; and
      4) said second aperture having a retractable plunger pin projecting therein and secured to said second latch member, said plunger pin engaging said notch in said latch to latch said first latch member to said second latch member.

12. The cutting tool according to claim 1 with:
   a) said track comprising a base with said base comprising at least one slot formed therein;
   b) said second latch member comprising:
      1) at least one groove formed therein and aligning with said slot formed in said base of said track;
      2) a passage formed therein at right angles to and open to said groove;
   c) a lock plate comprising:
      1) a flange formed at an upper edge of said lock plate and substantially at right angles to said lock plate; and
      2) an aperture formed therein,
   d) a lower portion of said lock plate opposite said flange:
      1) extending through said slot formed in said base of said track with said flange contacting an upper surface of said base of said track; and
      2) extending into said groove formed in said second latch member; and
      3) moveable lengthwise in said slot;
   e) a cam lock formed as a cylinder with a cam lobe projecting from said cam lock;
   f) said cam lock:
      1) rotatably secured in said passage formed in said second latch member; and
      2) passing through said aperture formed in said lock plate; and
   g) said flange of said lock plate drawing said base of said track downward to contact an upper surface of said second latch member as said cam lobe rotates down in said aperture formed in said lock plate and urges said lock plate downward to lock said base of said track to said latch member.

13. The cutting tool according to claim 1 with said positioning arm comprising:
   a) a housing attached to said carriage;
   b) an arm moving into and out of said housing and having a slot formed therein;
   c) a rack mounted in said arm;
   d) a pinion gear comprising radially projecting pinion teeth, said pinion teeth projecting through said slot of said moving arm and engaging teeth of said rack; and
   e) a shaft with said pinion gear attached at one end and a handwheel attached at an opposite end of said shaft.

14. The cutting tool according to claim 1 further comprising a lateral torch position manipulator moveably attaching said positioning arm to said carriage, said lateral torch position manipulator comprising:
   a) a fixed block unit attached to said carriage;
   b) a cam pattern block attached to said track;
   c) a movable block unit:
      1) having attached thereto said positioning arm;
      2) moveably attached to said fixed block unit;
      3) comprising a cam follower arm with a cam wheel contacting said cam pattern block; and
      4) moving with respect to said fixed block unit in response to cam wheel following said cam pattern block.

15. The cutting tool according to claim 14 with said fixed block unit comprising:
   a) a housing;
   b) a stationary end block fixed to said housing;
   c) a stationary spring block fixed to said housing;
   d) a rod attached to said end block at one end and to said spring block at an opposite end;
   e) a moveable block:
      1) having a hole formed therein with said rod passing through said hole;
      2) being moveable along said rod; and
      3) fixed to said moveable block unit;
   f) a tension spring:
      1) connected at one end to said moveable block;
      2) connected at said opposite end to said spring block; and
      3) urging said moveable block toward said spring block.

16. The cutting tool according to claim 1 further comprising a second rotating platform that rotatably attaches said positioning arm to said carriage.

17. The cutting tool according to claim 16 with said second rotating platform comprising a base plate attached to said carriage and a rotating plate attached to said positioning arm with said rotating plate rotatably mounted on said base plate by means of a pivot pin.

18. The cutting tool according to claim 17 with said rotating plate having at least one arcuate slot formed therein for receiving a handled bolt that is received in a threaded hole in said base plate.

19. The cutting tool according to claim 17 with said rotating plate having a spring loaded plunger mounted thereon and engaging a hole in said base plate.

20. The cutting tool according to claim 17 with said rotating plate comprising rotational indicia and said base comprising a reference indicator.

21. The cutting tool according to claim 1 with said cutting torch holder comprising:
   a) a base attached to said positioning arm and having a circular recess;

b) a rotating plate mounted for rotation in said circular recess;

c) two spaced-apart torch clamp brackets attached at one of each of their ends to said rotating plate;

d) a torch clamp pivoting on pivot pins mounted in said two spaced-apart torch clamp brackets at the ends opposite the ends of attachment to said rotating plate; and e) a spur gear mounted in said torch clamp for engaging a rack mounted on a cutting torch.

22. The cutting to claim 21 with said rotating plate driven in rotation by a screw passing through a cylinder moveably mounted in a slot formed in said rotating plate.

23. The cutting tool according to claim 21 with said rotating plate have rotational indica thereon, said indicia registering with a pointer formed in a window of said base.

24. The cutting tool according to claim 21 with said torch clamp driven into pivoting on pivot pins mounted in said torch clamp brackets by means of a spur gear mounted in said torch clamp brackets and engaging a curved rack mounted in said torch clamp.

25. The cutting tool according to claim 24 with said torch clamp having angle indicia thereon, said angle indicia registering with a pointer formed in a window of one of said torch clamp brackets.

26. The cutting tool according to claim 1 further comprising a second positioning arm for attaching said positioning arm to said cutting torch holder.

27. The cutting tool according to claim 26 with said second positioning arm comprising:

a) a housing attached to said arm of said positioning arm;

b) an arm moving into and out of said housing and having a slot formed therein;

d) a pinion gear comprising radially projecting pinion teeth, said pinion teeth projecting through said slot of said moving arm and engaging teeth of said rack; and e) a shaft with said pinion gear attached at one end and a handwheel attached at an opposite end of said shaft.

28. The cutting tool according to claim 1 with said clamp comprising:

a) a base plate formed from a horizontal plate and a vertical plate;

b) a stationary clamping block fixed to said base plate;

c) a moveable clamping block moveably attached to said base plate and urged to and from said first clamping block by means of a threaded rod rotating in a threaded hole formed in a block attached to said base plate.

29. The cutting tool according to claim 28 with said base plate having a pivot hole formed therein and further comprising:

a) a pivot plate attached to said base plate by means of a pivot pin passing through said pivot hole and attached at each end to said pivot plate; and b) said pivot plate having a horizontal position and a vertical position as a result of rotation about said pivot pin.

30. The cutting tool according to claim 29 further comprising:

a) a first handled pin engaging a hole in said horizontal plate to lock said rotating plate to said horizontal plate; and b) a second handled pin engaging a hole in said vertical plate to lock said rotating plate to said vertical plate.

31. The cutting tool according to claim 1 further comprising a cutting torch held in said cutting torch holder, said cutting torch having;

a) a fuel supply comprising a pressure gage, a flow control valve, and a quick-acting on-off value;

b) an oxygen supply comprising a pressure gage, an oxygen supply dividing line dividing said oxygen supply into a heating supply and a cutting supply, a flow control valve for said heating supply, and a quick-acting on-off valve for said heating supply and a quick-acting on-off valve for said cutting supply.

32. A cutting tool for cutting a workpiece comprising:

a) a clamp sized to attach to said workpiece;

b) a rotating platform, rotatably attached to said clamp;

d) a track attached to said rotating platform;

e) a carriage moveably attached to said track;

f) a second rotating platform rotatably attached to said carriage;

f) a positioning arm attached to said second rotating platform; and g) a torch holder attached to said positioning arm.

33. The cutting tool according to claim 32 with said second rotating platform comprising a base plate attached to said carriage and a rotating plate attached to said positioning arm with said rotating plate rotatably mounted on said base by means of a pivot pin.

34. The cutting tool according to claim 33 with said rotating plate having at least one arcuate slot formed therein for receiving a handled bolt that is received in a threaded hole in said base plate.

35. The cutting tool according to claim 33 with said rotating plate having a spring loaded plunger mounted thereon and engaging a hole in said base plate.

36. The cutting tool according to claim 33 with said rotating plate comprising rotational indicia and said base comprising a reference indicator.

37. A cutting torch holder comprising:

a) a base attached to said positioning arm and having a circular recess;

b) a rotating plate mounted for rotation in said circular recess;

c) two spaced-apart torch clamp brackets attached at one of each of their ends to said rotating plate;

d) a torch clamp pivoting on pivot pins mounted in said two spaced-apart torch clamp brackets at the ends opposite the ends of attachment to said rotating plate; and e) a spur gear mounted in said torch clamp for engaging a rack mounted on a cutting torch.

38. The cutting torch holder according to claim 37 with said rotating plate driven in rotation by a screw passing through a cylinder moveably mounted in a slot formed in said rotating plate.

39. The cutting tool according to claim 37 with said rotating plate having rotational indica thereon, said indicia registering with a pointer formed in a window of said base.

40. The cutting tool according to claim 37 with said torch clamp driven into pivoting on pivot pins mounted in said torch clamp brackets by means of a spur gear mounted in said torch clamp brackets and engaging a curved rack mounted in said torch clamp.

41. The cutting tool according to claim 40 with said torch clamp having angle indicia thereon, said angle indicia registering with a pointer formed in a window of one of said torch clamp brackets.

\* \* \* \* \*